US012795652B2

(12) United States Patent
Chen et al.

(10) Patent No.: US 12,795,652 B2
(45) Date of Patent: Nov. 10, 2026

(54) PTRS-DMRS ASSOCIATION FOR STRP/SDM PUSCH

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 429 days.

(21) Appl. No.: 18/364,311

(22) Filed: Aug. 2, 2023

(65) Prior Publication Data

US 2024/0064737 A1 Feb. 22, 2024

Related U.S. Application Data

(60) Provisional application No. 63/397,754, filed on Aug. 12, 2022.

(51) Int. Cl.
*H04W 72/1268* (2023.01)
*H04L 5/00* (2006.01)
*H04W 72/232* (2023.01)

(52) U.S. Cl.
CPC ....... *H04W 72/1268* (2013.01); *H04L 5/0051* (2013.01); *H04W 72/232* (2023.01)

(58) Field of Classification Search
CPC ............ H04W 72/1268; H04W 72/232; H04L 5/0051; H04L 5/0035; H04L 5/0023; H04L 5/0091; H04L 5/0048; H04B 7/10
(Continued)

(56) References Cited

U.S. PATENT DOCUMENTS

2023/0232415 A1 7/2023 Kim et al.
2023/0300832 A1* 9/2023 Zhang .................. H04L 5/0053 370/329

(Continued)

FOREIGN PATENT DOCUMENTS

WO 2022025590 A1 2/2022

OTHER PUBLICATIONS

Ericsson: "Remaining Issues on PDCCH, PUSCH and PUCCH Enhancements for Multi-TRP", 3GPP TSG-RAN WG1 Meeting #108-e, R1-2202266, 3rd Generation Partnership Project, Mobile Competence Centre, 650, Route Des Lucioles, F-06921 Sophia-Antipolis Cedex, France, vol. RAN WG1, No. eMeeting, Feb. 21, 2022-Mar. 3, 2022, Feb. 14, 2022, 15 Pages, XP052114795, Section 1.2.4.

(Continued)

*Primary Examiner* — Candal Elpenord
(74) *Attorney, Agent, or Firm* — LOZA & LOZA, LLP

(57) ABSTRACT

A plurality of configurations for an uplink phase tracking reference signal (PTRS) are received from a network entity, as well as downlink control information (DCI) for scheduling a physical uplink shared channel (PUSCH) associated with transmission parameters indicating one of single transmit reception point (sTRP) PUSCH or spatial division multiplexing (SDM) PUSCH. One or more uplink PTRS configurations are identified, based on the transmission parameters. The PUSCH is then transmitted to the network entity, where the PUSCH is associated with the identified one or more uplink PTRS configuration based on an association between the identified one or more uplink PTRS configuration and demodulation reference signal (DMRS) ports.

30 Claims, 17 Drawing Sheets

(58) Field of Classification Search
USPC .................................................. 370/329–330
See application file for complete search history.

(56) References Cited

U.S. PATENT DOCUMENTS

| | | | | |
|---|---|---|---|---|
| 2024/0275556 | A1 | 8/2024 | Chen et al. | |
| 2025/0113361 | A1* | 4/2025 | Kim | H04L 5/0023 |
| 2025/0219696 | A1* | 7/2025 | Matsumura | H04B 7/0626 |
| 2025/0220669 | A1* | 7/2025 | Kim | H04B 7/06968 |
| 2025/0234355 | A1* | 7/2025 | Chung | H04W 72/232 |
| 2025/0300781 | A1* | 9/2025 | Liu | H04B 7/0456 |

OTHER PUBLICATIONS

International Search Report and Written Opinion—PCT/US2023/071596—ISA/EPO—Dec. 4, 2023.

Qualcomm Incorporated: "Enhancements on Multi-TRP for PDCCH, PUCCH and PUSCH", 3GPP TSG-RAN WG1 Meeting #105-bis-e, R1-2104655, 3rd Generation Partnership Project, Mobile Competence Centre, 650, Route Des Lucioles, F-06921 Sophia-Antipolis Cedex, France, vol. RAN WG1, No. e-Meeting, 20210510-20210527, May 12, 2021, pp. 1-17, XP052010906, Sections 1-5, Sections 3, 4, Sections 4.1 and 4.4.

Xiaomi: "Enhancements on Multi-TRP for PDCCH, PUSCH and PUCCH", 3GPP TSG-RAN WG1 Meeting #106-e, R1-2107894, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 20 Pages, XP052038702, Sections 3.1 and 3.7.

* cited by examiner

700

| Value | DMRS port |
|---|---|
| 0 | 1st scheduled DMRS port |
| 1 | 2nd scheduled DMRS port |
| 2 | 3rd scheduled DMRS port |
| 3 | 4th scheduled DMRS port |

750

| Value of MSB | DMRS port | | Value of LSB | DMRS port |
|---|---|---|---|---|
| 0 | 1st DMRS port that shares PTRS port 0 | | 0 | 1st DMRS port that shares PTRS port 1 |
| 1 | 2nd DMRS port that shares PTRS port 0 | | 1 | 2nd DMRS port that shares PTRS port 1 |

FIG. 7

$$\frac{1}{2}\begin{bmatrix} 1 & 0 & 0 \\ 0 & 1 & 0 \\ -1 & 0 & 0 \\ 0 & 0 & 1 \end{bmatrix}$$

900

| Value | DMRS port |
|---|---|
| 0 | 1st scheduled DMRS port |
| 1 | 2nd scheduled DMRS port |
| 2 | 3rd scheduled DMRS port |
| 3 | 4th scheduled DMRS port |
| 4 | 5th scheduled DMRS port |
| 5 | 6th scheduled DMRS port |
| 6 | 7th scheduled DMRS port |
| 7 | 8th scheduled DMRS port |
| ... | ... |
| Reserved | Reserved |

950

| Value | DMRS port |
|---|---|
| 0 | 1st scheduled DMRS port |
| 1 | 2nd scheduled DMRS port |
| 2 | 3rd scheduled DMRS port |
| 3 | 4th scheduled DMRS port |
| 4 | 5th scheduled DMRS port |
| 5 | 6th scheduled DMRS port |
| Reserved | Reserved |
| Reserved | Reserved |

FIG. 9

PTRS-DMRS ASSOCIATION FOR STRP/SDM PUSCH

RELATED APPLICATIONS

The present application claims priority to U.S. provisional patent application No. 63/397,754 filed Aug. 12, 2022, and assigned to the assignee hereof and hereby expressly incorporated by reference herein as if fully set forth below and for all applicable purposes.

TECHNICAL FIELD

The present disclosure relates generally to communication systems, and more particularly, to communications based on single transmit reception point (sTRP)/spatial division multiplexing (SDM) physical uplink shared channel (PUSCH) and association between a phase tracking reference signal (PTRS) and a demodulation reference signal (DMRS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some examples, a user equipment (UE) configured for wireless communication is disclosed, comprising: a memory; and at least one processor coupled to the memory and configured to: receive, from a network entity, a plurality of configurations for an uplink phase tracking reference signal (PTRS); receive, from the network entity, downlink control information (DCI) for scheduling a physical uplink shared channel (PUSCH) associated with transmission parameters indicating one of single transmit reception point (sTRP) PUSCH or spatial division multiplexing (SDM) PUSCH; identify one or more uplink PTRS configurations based on the transmission parameters; and transmit, to the network entity, the PUSCH associated with the identified one or more uplink PTRS configuration based on an association between the identified one or more uplink PTRS configuration and demodulation reference signal (DMRS) ports.

In some examples, a method for wireless communication of a user equipment (UE) is disclosed, comprising: receiving, from a network entity, a plurality of configurations for an uplink PTRS; receiving, from the network entity, DCI for scheduling a PUSCH associated with transmission parameters indicating one of sTRP PUSCH or SDM PUSCH; identifying one or more uplink PTRS configurations based on the transmission parameters; and transmitting, to the network entity, the PUSCH associated with the identified one or more uplink PTRS configuration based on an association between the identified one or more uplink PTRS configuration and DMRS ports.

In some examples, a network entity configured for wireless communication, is disclosed, comprising: a memory; and at least one processor coupled to the memory and configured to: transmit a plurality of configurations for an uplink PTRS; transmit DCI for scheduling a PUSCH associated with transmission parameters indicating one of sTRP PUSCH or SDM PUSCH; and receive a PUSCH associated with identified one or more uplink PTRS configurations based on the transmission parameters, wherein the PUSCH is based on an association between the identified one or more uplink PTRS configurations and DMRS ports.

In some examples, a method for wireless communication for a network entity, is disclosed, comprising: transmitting a plurality of configurations for an uplink PTRS; transmitting DCI for scheduling a PUSCH associated with transmission parameters indicating one of sTRP PUSCH or SDM PUSCH; and receiving a PUSCH associated with identified one or more uplink PTRS configurations based on the transmission parameters, wherein the PUSCH is based on an association between the identified one or more uplink PTRS configurations and DMRS ports.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 illustrates PTRS-DMRS association tables for uplink PTRS ports according to some aspects.

FIG. 9 illustrates PTRS-DMRS association tables for uplink PTRS ports according to some aspects.

DETAILED DESCRIPTION

Figure 1:
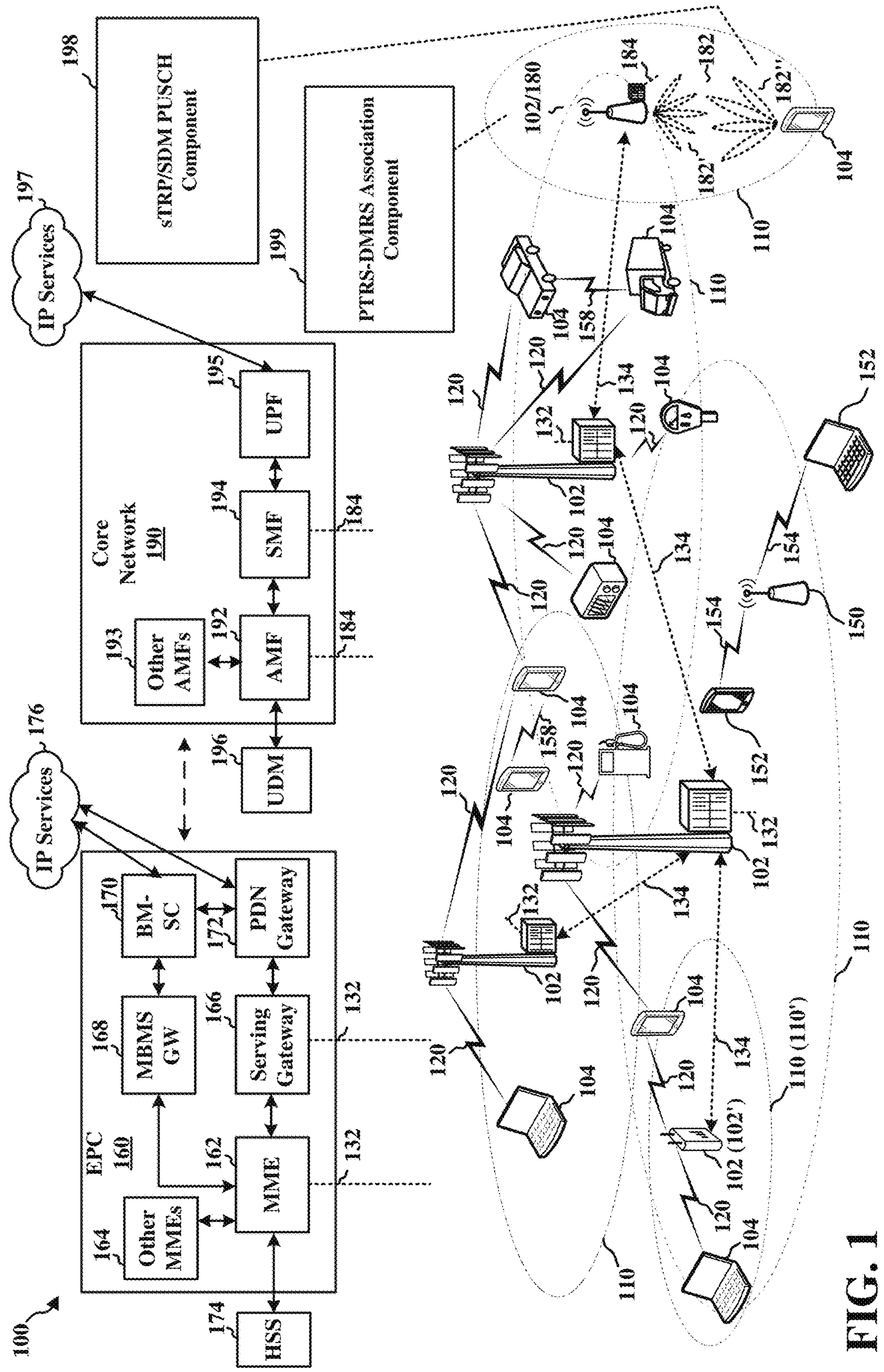
FIG. 1 is a diagram illustrating an example of a wireless communications system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes network entities (e.g., base stations) 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a single transmit reception point (sTRP)/spatial division multiplexing (SDM) physical uplink shared channel (PUSCH) component 198 configured receive, from the base station, downlink control information (DCI) for scheduling a physical uplink shared channel (PUSCH) associated with transmission parameters indicating one of single transmit reception point (sTRP) PUSCH or spatial division multiplexing (SDM) PUSCH; identify an uplink PTRS configuration based on the transmission parameters; and transmit, to the base station, the PUSCH associated with the identified configuration the transmission parameters based on an association between the identified uplink PTRS configuration and demodulation reference signal (DMRS) ports. In certain aspects, the base station 180 may include a PTRS-DMRS association component 199 configured to transmit, to a UE, a configuration for an uplink PTRS; transmit, to the UE, DCI that schedules a PUSCH based on one of sTRP or SDM, the PUSCH associated with a plurality of transmission parameters; and receive, from the UE, the PUSCH associated with an uplink PTRS configuration based on the transmission parameter, wherein the plurality of transmission parameters based on an association between the uplink PTRS and DMRS ports. Although the following description may be focused on 5G NR, the concepts described herein may be applicable to other similar areas, such as LTE, LTE-A, CDMA, GSM, and other wireless technologies.

Figure 2A:
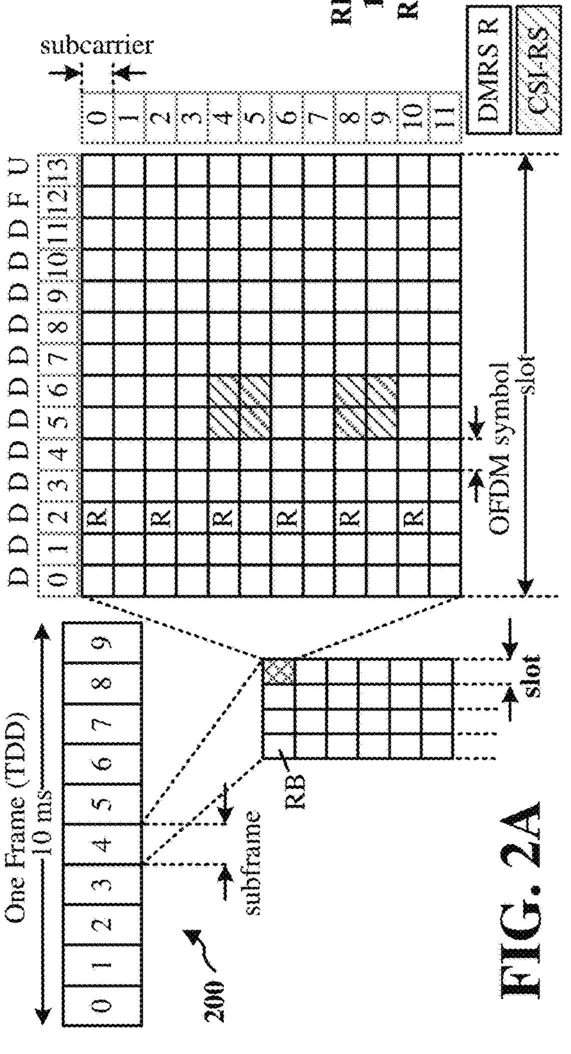
FIG. 2A is a diagram illustrating an example of a first frame, in accordance with various aspects of the present disclosure.
Figure 2B:
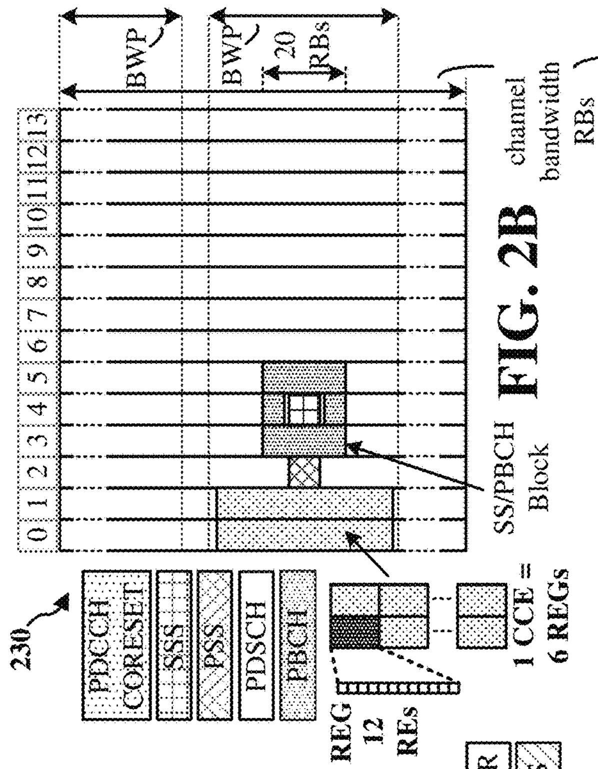
FIG. 2B is a diagram illustrating an example of DL channels within a subframe, in accordance with various aspects of the present disclosure.
Figure 2C:
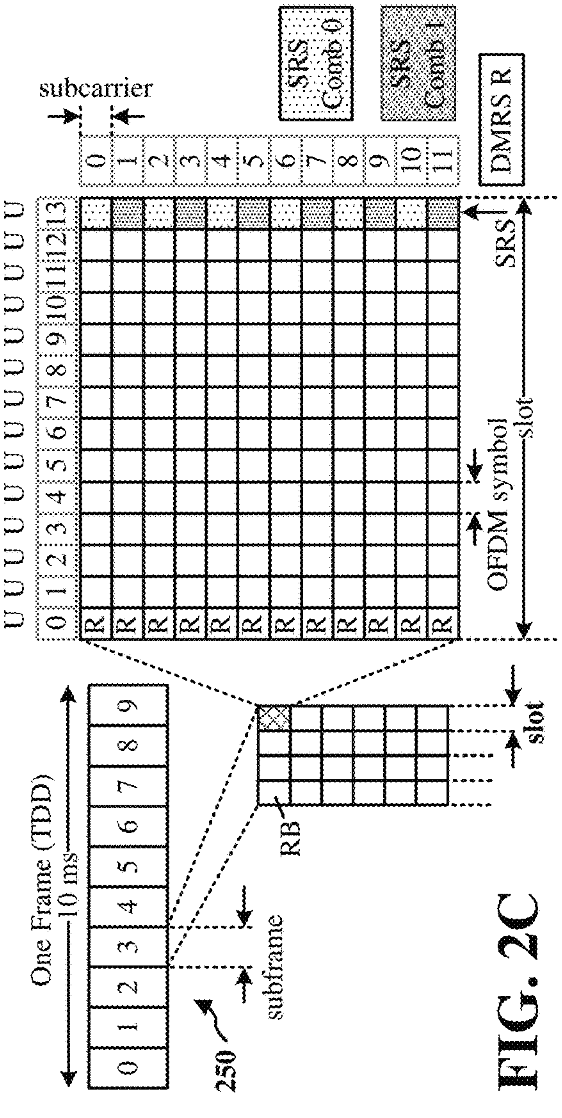
FIG. 2C is a diagram illustrating an example of a second frame, in accordance with various aspects of the present disclosure.
Figure 2D:
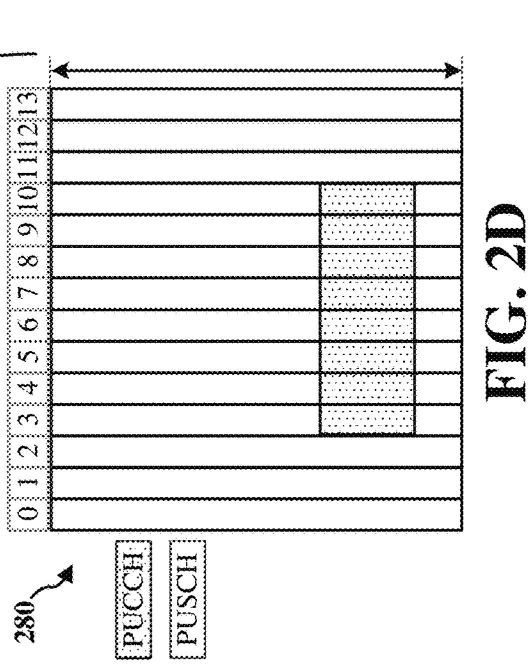
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PTRS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six resource element (RE) groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
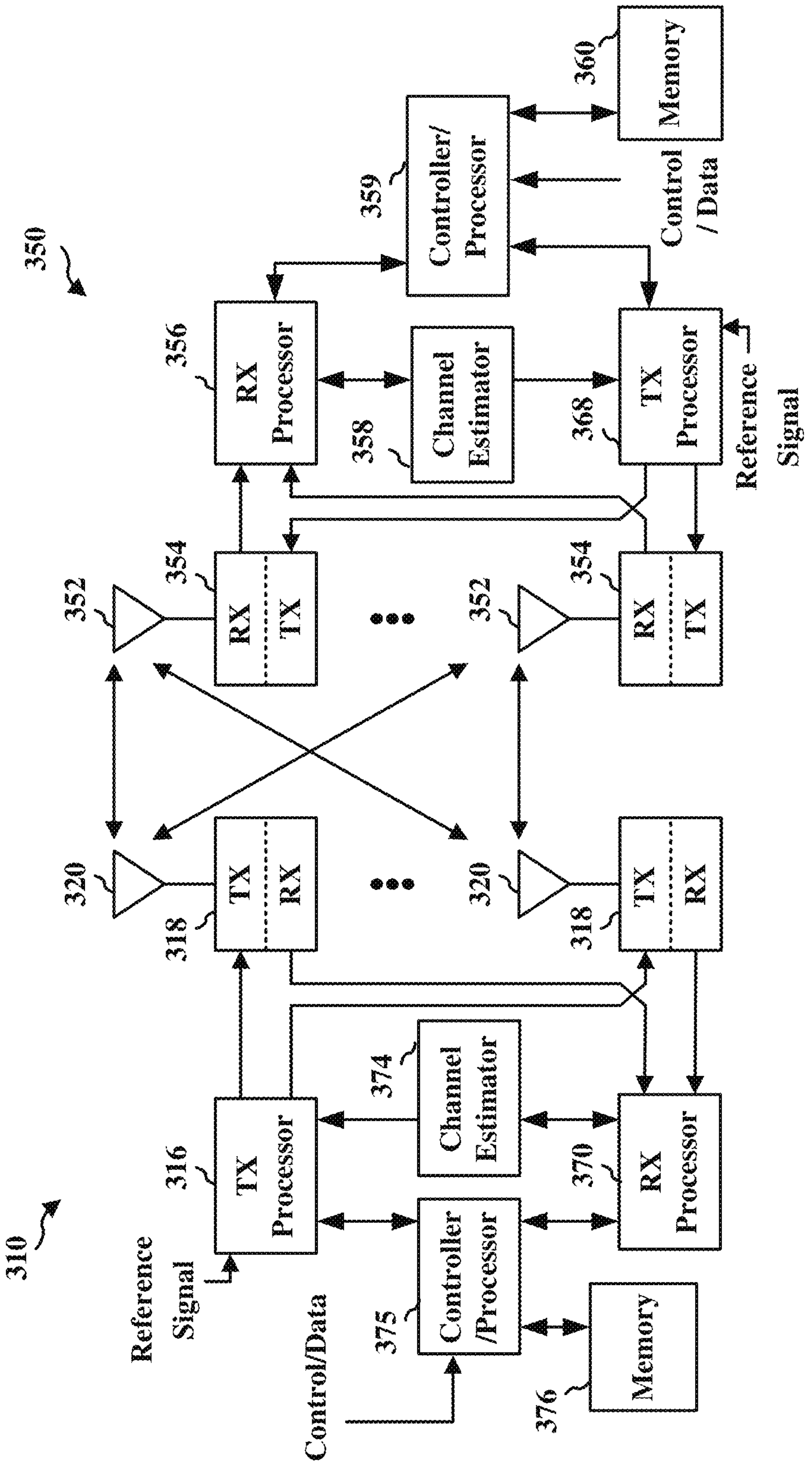
FIG. 3 is a diagram illustrating an example of a base station and user equipment (UE) in an access network according to some aspects.

FIG. 3 is a block diagram of a network entity (e.g., base station) 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SDM PUSCH 198 of FIG. 1.

At least one of the TX processor 316, the RX processor 370, and the controller/processor 375 may be configured to perform aspects in connection with the PTRS-DMRS association component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
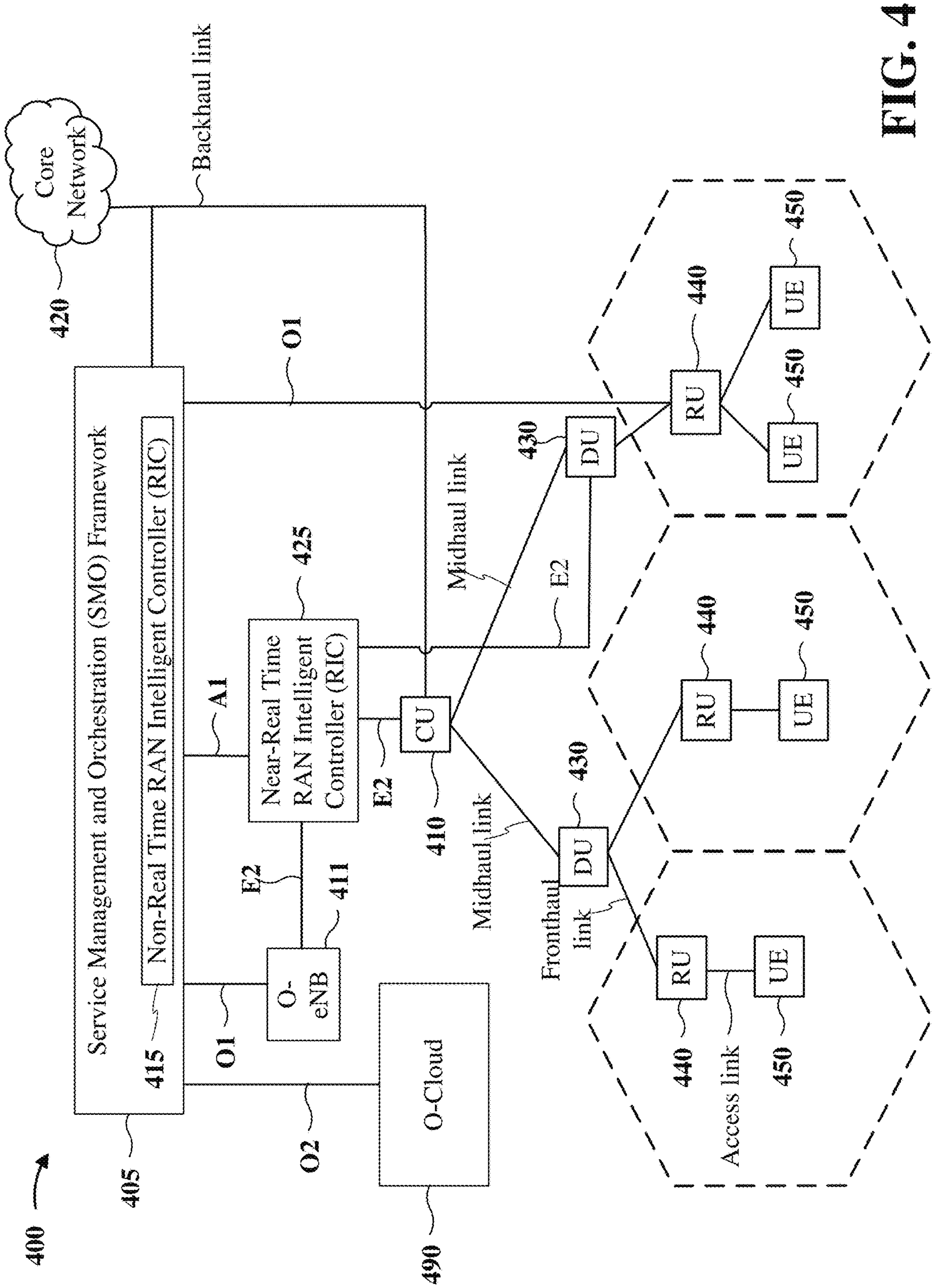
FIG. 4 shows a diagram illustrating an example disaggregated base station architecture according to some aspects.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 450 via one or more radio frequency (RF) access links. In some implementations, the UE 450 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 450. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
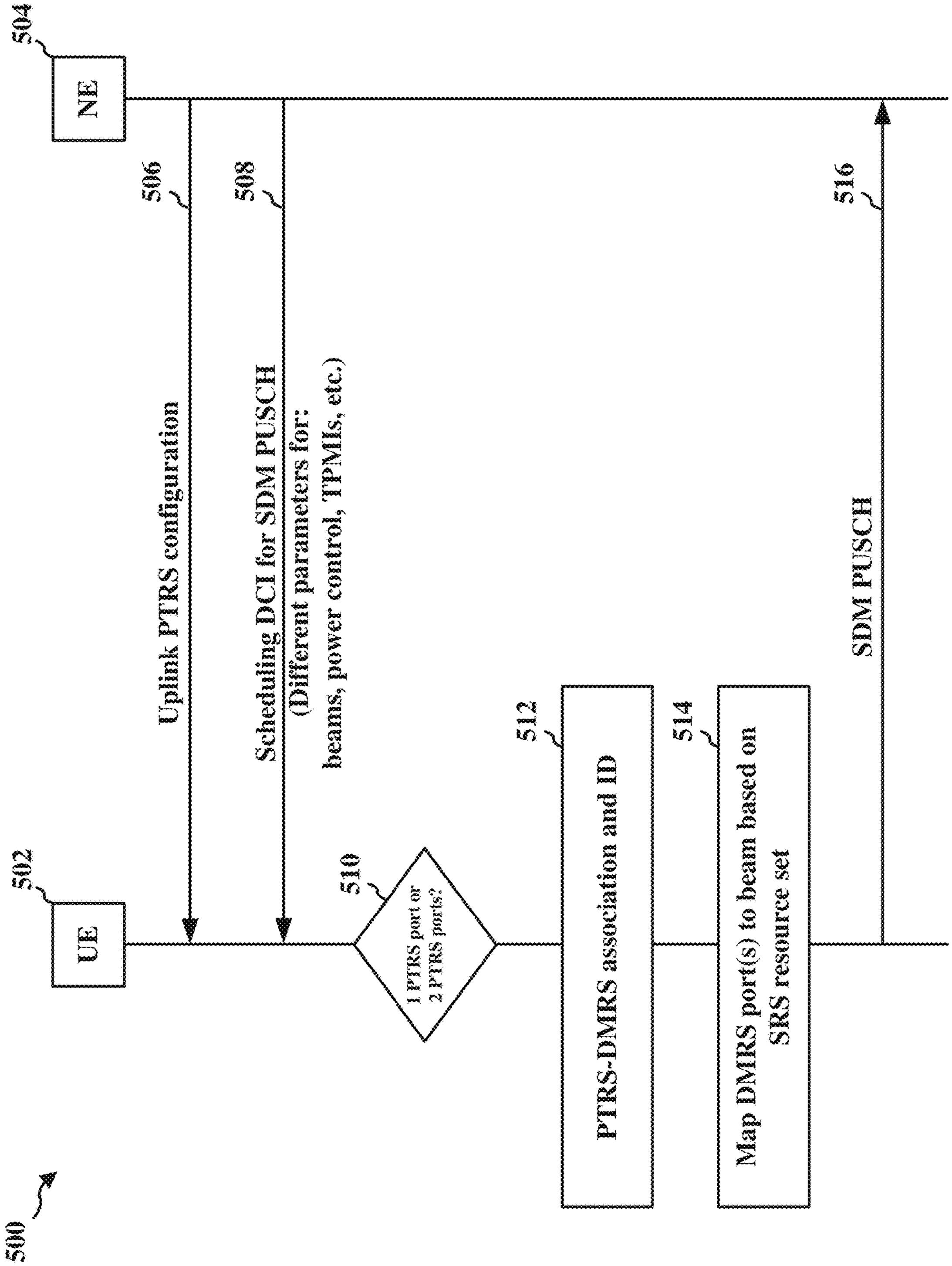
FIG. 5 is a call flow diagram illustrating communications between a UE and a network entity according to some aspects.

FIG. 5 is a call flow diagram 500 illustrating communications between a UE 502 and a network entity 504. At 506, the network entity 504 may transmit an uplink PTRS configuration to the UE 502. Uplink PTRS associated with the uplink PTRS configuration may correspond to one or more PTRS ports. The uplink PTRS may be used for phase noise corrections, such as phase noise associated with FR2 signaling. At 508, the network entity 504 may transmit scheduling DCI to the UE 502 for transmitting an SDM PUSCH. The SDM PUSCH may be associated with different sets of layers that have different sets of transmission parameters. For example, the different transmission parameters may correspond to different beam parameters, different power control parameters, different transmit precoding matrix indexes (TPMIs), etc.

At 510, the UE 502 may determine whether the uplink PTRS configuration received, at 506, and the scheduling DCI received, at 508, from the network entity 504 is associated with 1 PTRS port or 2 PTRS ports. At 512, the UE 502 may perform PTRS-DMRS association differently based on whether 1 PTRS port or 2 PTRS ports are configured. For example, if 1 PTRS port is configured, the PTRS-DMRS association performed, at 512, may be based on associating the uplink PTRS with a DMRS port via a single value indicated in a PTRS-DMRS association field of the scheduling DCI received, at 508. However, if 2 PTRS ports are configured, the PTRS-DMRS association performed, at 512, may be based on associating the uplink PTRS with a DMRS port based on a plurality of bits included in the PTRS-DMRS association field of the scheduling DCI received, at 508. A first bit/most significant bit (MSB) of the plurality of bits may be indicative of a first DMRS port and a second bit/least significant bit (LSB) of the plurality of bits may be indicative of a second DMRS port.

At 514, the UE 502 may map the DMRS port(s) to a beam based on at least one SRS resource set or a code division multiplexing (CDM) group. The mapping techniques, at 514, may be performed by the UE 502 regardless of how the UE 502 performs the PTRS-DMRS association, at 512 and identifies an uplink PTRS configuration based on the transmission parameters. At 516, the UE 502 may transmit the SDM PUSCH to the network entity 504 based on the PTRS-DMRS association performed, at 512, and the mapping performed, at 514.

Figure 6:
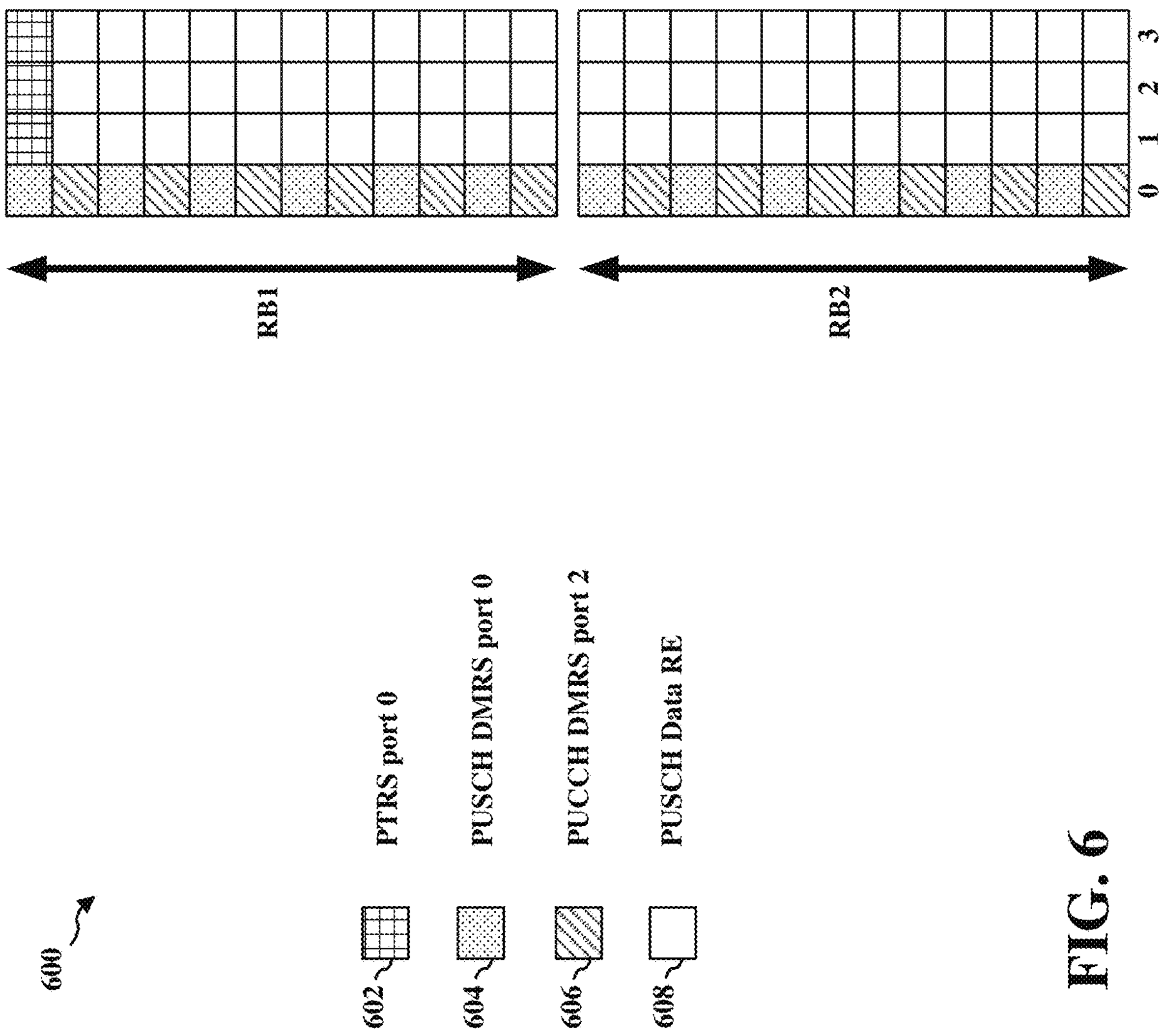
FIG. 6 is a diagram that illustrates a phase tracking reference signal (PTRS)-demodulation reference signal (DMRS) allocation according to some aspects.

FIG. 6 is a diagram 600 that illustrates a PTRS-DMRS allocation. PUSCH transmissions from a UE may be codebook-based or non-codebook-based. That is, PUSCH transmissions may or may not be based on a codebook/matrix that is used to transform data bits into another set of data that maps to antenna ports of the UE. For a codebook-based transmission, the UE may be configured with one SRS resource set, where the "usage" of the SRS resource set may be set to "codebook." Some resource sets for codebook-based transmission may be limited to a maximum of 4 SRS resources within the resource set that may be configured for the UE. For instance, communications of the UE may be associated with rank 4 or less.

Each SRS resource may be RRC-configured with a number of ports (e.g., via nrofSRS-Ports). The number of ports may correspond to the rank associated with the communication of the UE. An SRS resource indicator (SRI) field included in uplink DCI associated with a scheduling PUSCH may indicate one SRS resource. The number of ports configured for the UE based on the indicated SRS resource may correspond to a number of antenna ports for the PUSCH. The PUSCH may be transmitted based on a same spatial domain filter (e.g., uplink beam) as the indicated SRS resources. The number of layers, which may be indicative of the rank, and a TPMI for a precoder of the scheduled PUSCH may be determined based on a separate DCI field (e.g., a precoding information and number of layers field).

For a non-codebook-based transmission, the UE may be configured with one SRS resource set, where the usage of the SRS resource set may be set to "non-codebook." Some resource sets for non-codebook-based transmission may be limited to a maximum of 4 SRS resources within the resource set that may be configured for the UE. For instance, communications of the UE may be associated with rank 4 or less. Unlink for codebook-based SRS resources, each non-codebook-based SRS resource may be associated with one port. Also different from codebook-based configurations is that the SRI field included in the uplink DCI associated with the scheduling PUSCH may indicate one or more SRS resources in non-codebook-based configurations. The number of indicated SRS resources may be indicative of the rank (e.g., number of layers) of the scheduled PUSCH. The PUSCH may be transmitted with the same precoder and spatial domain filter (e.g., uplink beam) as the indicated SRS resources.

Uplink PTRS associated with PTRS port 0 602 may be transmitted within a number of RBs allocated for the PUSCH and may be used for phase noise correction. For example, the PTRS may be used to reduce phase noise in FR2 signaling. In the diagram 600, the number of allocated RBs is 2 RBs corresponding to RB1 and RB2. The PTRS may be transmitted in PUSCH OFDM symbols that do not include DMRS (e.g., symbols 1-3 of the diagram 600 that mostly include PUSCH data REs 608). In symbols that include DMRS, such as symbol 0, there may be no need for phase noise correction, and thus there may be no need to include the PTRS in such symbols. The PTRS may have a sparse frequency allocation. For example, the PTRS may be allocated to one tone per port every 2-4 RBs. The diagram 600 illustrates a PTRS allocation for PTRS port 0 602 to one tone over RB1 and RB2.

While the PTRS allocation may be sparse in frequency domain, in some cases the PTRS allocation may be dense in time domain. For example, PTRS may be allocated every 1 OFDM symbol, every 2 OFDM symbols, every 4 OFDM symbols, etc. In the diagram 600, the PTRS associated with PTRS port 0 602 is allocated every 1 OFDM symbol without a gap in time domain. That is, the PTRS is allocated to each of symbols 1 through 3. Symbol 0 may not include a PTRS allocation, as symbol 0 includes DMRS associated with PUSCH DMRS port 0 604 and PUSCH DMRS port 2 606.

Allocations of the PTRS may be based on an RRC configuration (e.g., via RRC parameter PTRS-UplinkConfig). A maxNrofPorts parameter may be configured for 1 port or 2 ports. For example, 2 PTRS ports may be configured for CP-OFDM waveforms, whereas 1 PTRS port may be configured for full-coherent UEs. Full-coherent may refer to configurations where two or more ports are shared between each layer (e.g., DMRS port). An actual number of PTRS ports for non-codebook-based configurations, where maxNrofPorts=2, may be based on a value indicated in the SRI field. The SRI field may indicate one or more SRS resources. Each SRS resource may be configured with a PTRS port index. If the SRS resources indicated via the SRI field correspond to a same value for the PTRS port index, then one PTRS port may be configured. Otherwise, 2 PTRS ports may be configured.

In codebook-based examples associated with partial-coherent or non-coherent UEs, an actual number of PTRS ports, where maxNrofPorts=2, may be based on the TPMI indicated via the precoding information and number of layers field. Partial-coherent may refer to configurations where two or more ports are shared between some of the layers, but not all of the layers. Non-coherent may refer to configurations where each layer is associated with one port.

FIG. 7 illustrates PTRS-DMRS association tables 700-750 for uplink PTRS ports. The table 700 may be used for cases where one uplink PTRS port is configured. For example, the PTRS may be transmitted on a strongest layer (e.g., DMRS port) based on an association with the DMRS port. Determinations of the strongest layer may be performed in instances where more than one layer is scheduled (e.g., more than one DMRS port is available). In examples where one layer is scheduled, such determinations/procedures may not be performed, as there is just one layer to choose from as the strongest layer. Thus, the PTRS may be transmitted on the one layer/DMRS port. Uplink DCI (e.g., DCI formats 0_1, 0_2) may include a PTRS-DMRS association field. The field may include 2 bits, if uplink PTRS is configured, a CP-OFDM waveform is used (e.g., transform precoder is disabled), and a MaxRank>1 is configured. In other configurations, the PTRS-DMRS association field may be excluded.

If one uplink PTRS port is configured (e.g., PTRS port 0), a value of a bit associated with the PTRS-DRMS association field may indicate the DMRS port that is associated with the PTRS port. For example, as illustrated in the table 700, a value of 0 may be indicative of a first scheduled DMRS port, a value of 1 may be indicative of a second scheduled DMRS port, a value of 2 may be indicative of a third scheduled DMRS port, and a value of 3 may be indicative of a fourth scheduled DMRS port. If the PTRS-DMRS association field includes 2 bits, the value of the bit used to perform the PTRS-DMRS association may correspond to the second bit. The first bit of the 2 bits may be disregarded, as the PTRS port is not associated with more than one DMRS port.

If a plurality of uplink PTRSs are configured (e.g., PTRS ports 0 and PTRS port 1), a first bit of the 2 bits included in the PTRS-DMRS association field may indicate a first DMRS port of a plurality of DMRS ports that share PTRS port 0, and a second bit of the 2 bits included in the PTRS-DMRS association field may indicate a second DMRS port of the plurality of DMRS ports that share PTRS port 1. In order to determine which DMRS ports share which PTRS ports, the first bit may correspond to a value of an MSB and the second bit may correspond to a value of an LSB, as illustrated in the table 750. If the first bit/MSB has a value of 0, the first DMRS port may share PTRS port 0. If the first bit/MSB has a value of 1, the second DMRS port may share PTRS port 0. Similarly, if the second bit has a value of 0, the first DMRS port may share PTRS port 1. If the second bit has a value of 1, the second DMRS port may share PTRS port 1. Accordingly, the first bit/MSB may be used to identify which DMRS ports share PTRS port 0 based on a value of the first bit/MSB (e.g., value 0=first DMRS port; value 1=second DMRS port), and the second bit/LSB may be used to identify which DMRS ports share PTRS port 1 based on a value of the second bit/LSB (e.g., value 0=first DMRS port; value 1=second DMRS port).

For non-codebook-based uplink PTRS, the SRI field may indicate one or more SRS resources. A one-to-one mapping between the indicated SRS resources and the indicated DMRS ports may be performed via an antenna ports field. Each SRS resource may be configured with a PTRS port index. For example, SRS resources [0,1] may be RRC configured with PTRS port 0 and SRS resources [2,3] may be RRC configured with PTRS port 1. The SRI field of the DCI may indicate the 4 SRS resources. The antenna ports field of the DCI may indicate which DMRS ports share which PTRS ports. For example, DMRS ports 0-1 may share PTRS port 0 and DMRS ports 2-3 may share PTRS port 1. The PTRS-DMRS association field of the DCI may indicate the PTRS-DMRS association.

For codebook-based uplink PTRS, where the configuration may be associated with a partial-coherent UE or a non-coherent UE, the TPMI may indicate the PTRS-DRMS association. For example, the TPMI may indicate that PUSCH antenna ports 1000 and 1002 share PTRS port 0, and PUSCH antenna ports 1001 and 1003 share PTRS port 1. The DMRS ports may correspond to the layers that are transmitted with the PUSCH antenna ports. For example, PUSCH antenna port 1000 and PUSCH antenna port 1002 may be indicated via the TPMI as sharing PTRS port 0.

Figure 8:
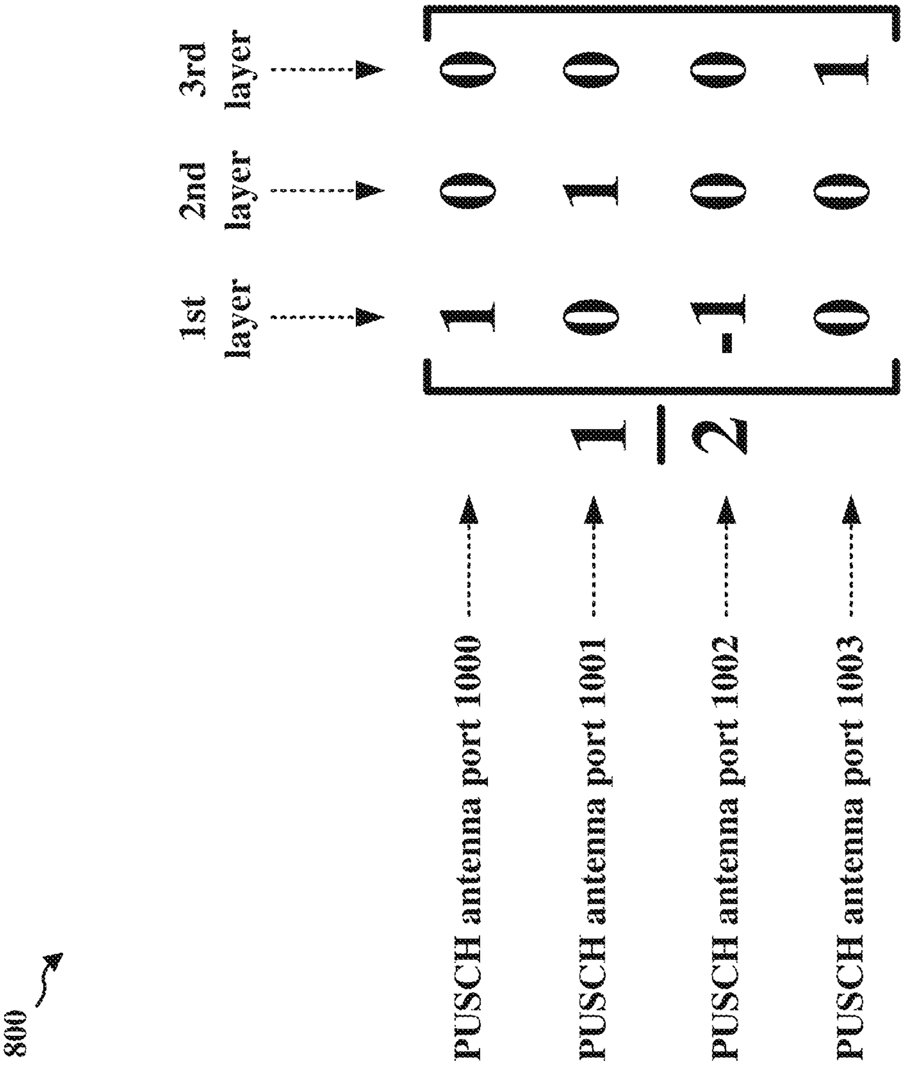
FIG. 8 is a diagram illustrating a transmit precoding matrix index (TPMI) matrix indicative of PTRS-DMRS association according to some aspects.

FIG. 8 is a diagram 800 illustrating a TPMI matrix indicative of PTRS-DMRS association. The diagram 700 illustrates 4 PUSCH antenna ports and 3 layers that correspond to 3 DMRS ports. The first layer/first DMRS port is associated with PUSCH antenna ports 1000 and 1002 based on non-zero values included in the corresponding rows of the TPMI matrix. The second layer/second DMRS port is associated with PUSCH antenna port 1001 based on value 1 included in the second row of the TPMI matrix. The third layer/third DMRS port is associated with PUSCH antenna port 1003 based on value 1 included in the fourth row of the TPMI matrix.

The precoding information and number of layers field included in the DCI may indicate 3 layers and a TPMI index of 2, which may correspond to the TPMI matrix illustrated in the diagram 800. The antenna ports field may indicate that DMRS ports 0-2 (e.g., the first DMRS port through the third DMRS port) correspond to the three layers illustrated in the diagram 800. The first layer may be transmitted with PUSCH antenna ports 1000 and 1002, as the first layer/DMRS port 0 shares PTRS port 0. The second layer may be transmitted with PUSCH antenna port 1001, and the third layer may be transmitted with PUSCH antenna port 1003, as the second layer/DMRS port 1 and the third layer/DMRS port 2 share PTRS port 1.

The first bit of the PTRS-DMRS association field may not be used if one DMRS port shares one PTRS port. However, the second bit of the PTRS-DMRS association field may indicate which DMRS port out of the DMRS ports that share the PTRS port are associated with the PTRS port. PTRS may be mapped to REs based on the parameter $$k_{ref}^{RE}.$$

For DMRS configuration type 1, the PTRS may be mapped to DMRS ports 0-3. For DMRS configuration type 2, the PTRS may be mapped to ports 0-5. That is, DMRS configuration type 1 may be associated with rank 4 or less and DMRS configuration type 2 may be associated with ranks 1 to 4+.

Spatial division multiplexing (SDM) for a PUSCH may provide different sets of layers that have different transmission parameters. For example, the different sets of layers may be associated with different beams, different sets of power control parameters, different TPMIs, etc. Further, rank combinations such as 1+1, 1+2, 2+1, and 2+2 may be supported in association with SDM PUSCH based on the PTRS-DMRS associations being explicitly indicated to the UE.

Configurations associated with different sets of layers may follow different protocols than configurations associated with a single beam. If the UE is configured with uplink PTRS and the UE receives DCI that schedules an SDM PUSCH having different sets of transmission parameters (e.g., different beams, different sets of power control parameters, different TPMIs, etc.), the UE may separately determine the PTRS-DMRS associations for the different sets of layers/DMRS ports. If two PTRS ports are configured, the 2 bits included in the PTRS-DMRS association field of the DCI may be used to indicate which DMRS ports are associated with which PTRS ports. For example, the 2 bits may indicate which of the DMRS ports share PTRS port 0 and which of the DMRS ports share PTRS port 1.

For codebook-based configurations associated with 2 TPMIs, the DMRS ports associated with the first TPMI/first SRS resource set may share PTRS port 0, and the DMRS ports associated with the second TPMI/second SRS resource set may share PTRS port 1. Accordingly, the first bit may indicate the PTRS-DMRS association for the DMRS port associated with the first TPMI/SRS resource set, and the second bit may indicate the PTRS-DMRS association for a different DMRS port associated with the second TPMI/second SRS resource set. For non-codebook-based configurations, the DMRS ports associated with the first SRS resource set (e.g., the SRS resources indicated via the first SRI and selected from the first SRS resource set) may share PTRS port 0. The DMRS ports associated with the second SRS resource set (e.g., the SRS resources indicated via the second SRI and selected from the second SRS resource set) may share PTRS port 1.

If one PTRS port is configured, the 2 bits in the PTRS-DMRS association field of the DCI may be used to indicate which DMRS ports are associated with the PTRS based on a value of a single bit, such as the second bit. For example, values 0-3 may be indicative of the first DMRS port through the fourth DMRS port, respectively, as illustrated in the table 800 and the tables 900-950 shown in FIG. 9. A mapping from the DMRS ports to the beams may be based on CDM groups, SRS resource sets, etc. For example, based on CDM groups, the DMRS ports associated with a first CDM group may correspond to a first beam and the DRMS ports associated with a second CDM group may correspond to a second beam.

In a first example associated with a codebook-based PUSCH, the UE may have 4 antenna ports, a rank combination of 2+2, and 2 PTRS ports. TPMI 0 may be indicated for the first two layers and TPMI 2 may be indicated for the second two layers. Thus, the 2 bits in the PTRS-DMRS association field of the DCI may correspond to '01'. The first DMRS port and the second DMRS port (e.g., associated with the first TPMI) may share PTRS port 0. Similarly, the third DMRS port and the fourth DMRS port (e.g., associated with the second TPMI) may share PTRS port 1. Since the MSB is 0, the first DMRS port may be associated with PTRS port 0. Since the LSB is 1, the fourth DMRS port may be associated with PTRS port 1.

In a second example associated with a non-codebook-based PUSCH, the UE may have 4 antenna ports, a first SRS resource set may have two SRS resources [0,1] and a second SRS resource set may have another two SRS resources [2,3]. The antenna ports field of the DCI may indicate that SRS resources 0-3 correspond to the first DMRS port through the fourth DMRS port, where SRS resources [0,1] may share PTRS port 0 and SRS resources [2,3] may share PTRS port 1. If the 2 bits in the PTRS-DMRS association field of the DCI correspond to '10', DMRS port 1 may be associated with PTRS port 0 and DMRS port 2 may be associated with PTRS port 1.

FIG. 9 illustrates PTRS-DMRS association tables 900-950 for uplink PTRS ports. In some configurations, 4 layers (e.g., DMRS ports) may be utilized across both beams. However, other uplink configurations may include a rank that is greater than 4 (e.g., rank 8) for a single TRP (e.g., sTRP) or multi-TRP transmissions (e.g., SDM). For example, the tables 900-950 may be used in association with ranks that are greater than 4. Hence, in addition to rank combinations 1+1, 1+2, 2+1, and 2+2, some configurations may be extended to include additional rank combinations, such as rank combinations 2+3, 3+2, 3+3, 3+4, 4+3, and 4+4 (e.g., with or without restrictions for mapping the PTRS to the REs).

The table 900 may be used for PTRS-DMRS association for configurations that do not include mapping restrictions from the PTRS to the REs. The values listed in the table 900 may be indicated via the PTRS-DMRS association field and may correspond to respective scheduled DMRS ports. The PTRS-DMRS association may also be associated with reserved fields in the table 900.

For SDM PUSCH, the PTRS port may be associated with one of the two beams. The mapping from the DMRS ports to the beams may be based on CDM groups, SRS resource sets, etc. If one PTRS port is configured, an enhanced PTRS-DMRS association field of the DCI (e.g., that includes 4 bits) may be used to indicate which DMRS port is associated with the PTRS port. For example, enhanced PTRS-DMRS association may be performed based on the table 900 to associate the PTRS with one DMRS port, where the rank/number of configured DMRS ports may be greater than 4 (e.g., rank 8). That is, the PTRS-DMRS association field may indicate one DMRS port (e.g., out of 8 DMRS ports) to be associated with the PTRS port. If multiple PTRS ports are configured, a first set of 2 bits and a second set of 2 bits (e.g., 4 total bits) may be included in the PTRS-DMRS association field of the DCI to indicate the associations, rather than a first bit individually and a second bit individually as used in rank 4 configurations.

For configurations associated with restrictions for mapping the PTRS to the REs, and where one PTRS port is configured, the PTRS-DMRS association may be based on a DMRS configuration type. For DMRS configuration type 1, a 2-bit PTRS-DMRS association field of the DCI may be indicative of a value associated with a PTRS-DMRS association table, such as the table 700 in FIG. 7, used for determining which DMRS port is associated with the PTRS. For DMRS configuration type 2, an enhanced 3-bit PTRS-DMRS association field of the DCI may be indicative of a value associated with a higher rank PTRS-DMRS association table (e.g., the table 950) used for determining which DMRS port is associated with the PTRS. The table 950 includes values that may be indicated via the PTRS-DMRS association field as well as the respective scheduled DMRS ports that correspond to the values. The PTRS-DMRS association may also be associated with one or more of the reserved fields of the table 950.

The PTRS port may correspond to two beams for SDM PUSCH. Similar to the mapping for the one beam, the mapping of the DMRS ports to the two beams may be based on CDM groups, SRS resource sets, etc. If two PTRS ports are configured, the PTRS ports may be associated with the first DMRS port through the fourth DMRS port for DMRS configuration type 1. For DMRS configuration type 2, a first set of 2 bits and a second set of 2 bits (e.g., 4 total bits) may be included in the PTRS-DMRS association field of the DCI to indicate the associations, rather than a first bit individually and a second bit individually as used in rank 4 configurations. Restrictions to the PTRS-DMRS association may include that certain rank combinations may not be configured, e.g., rank combination 3+4, 4+3, 4+4. Such indication may be based on the table 950.

Figure 10:
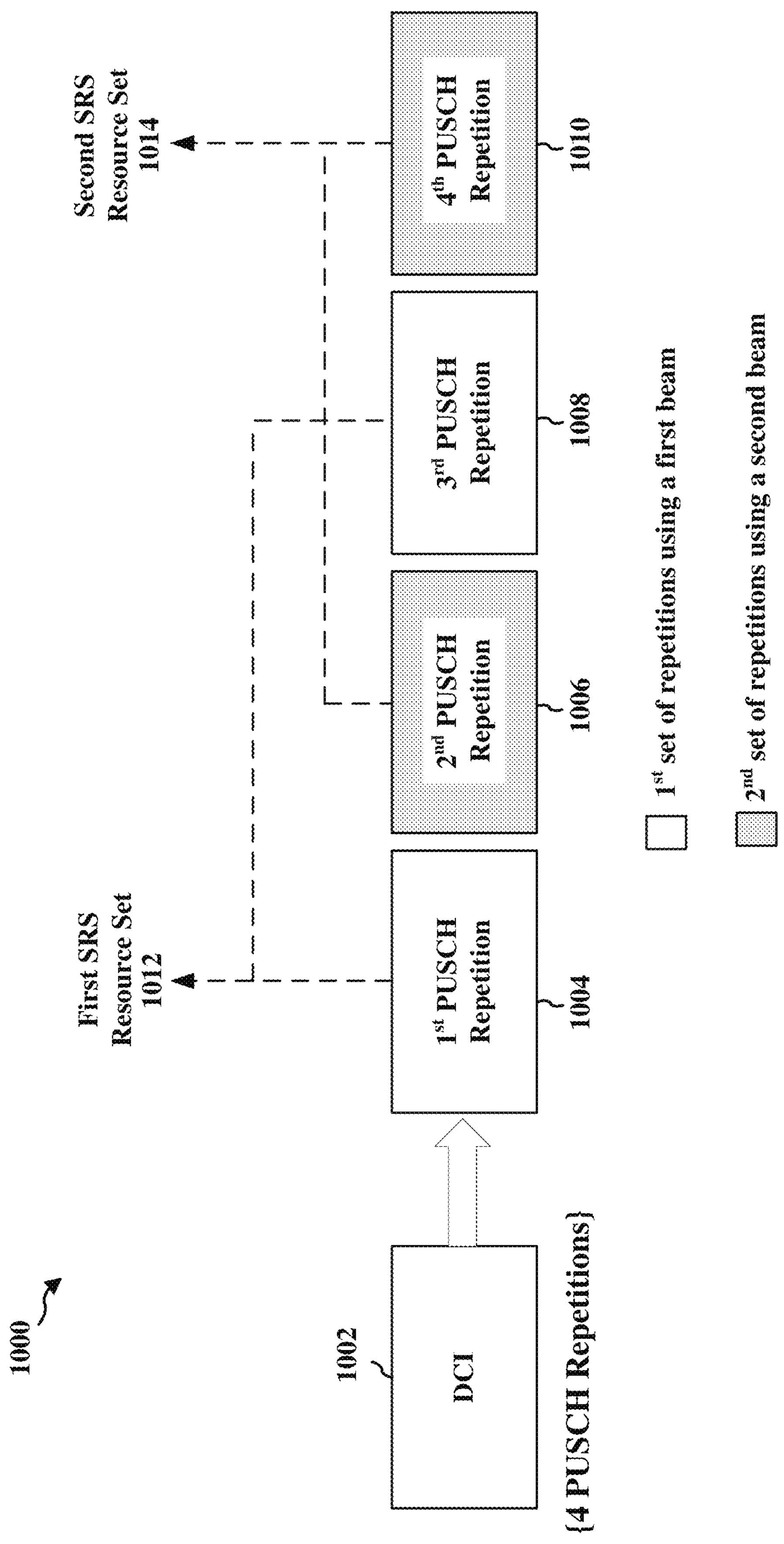
FIG. 10 illustrates a single DCI-based PUSCH repetition configuration under some aspects of the present disclosure.

In some examples, time-division multiplex (TDM) PUSCH may be scheduled in a DCI for the PTRS port to be associated with one of the two beams. The mapping from the DMRS ports to the beams may be based on CDM groups, SRS resource sets, etc. TDM is utilized to allow PUSCH repetition scheduling in a single DCI to specify different transmission parameters. FIG. 10 illustrates a single DCI-based PUSCH repetition configuration under some aspects of the present disclosure. In this example, the UE (e.g., 502) receives a scheduling DCI 1002 from a network entity (e.g., 504), in which the DCI schedules 4 PUSCH repetitions 1004, 1006, 1008 and 1010, as shown in the figure. The repetitions (1004-1006) may be scheduled such that a first set of repetitions 1004, 1008 may be associated with a first SRS resource set 912 of a first beam having a first set of power control parameters targeted towards a first TRP. A second set of repetitions 1006, 1010 may be associated with a second SRS resource set 914 of a second beam having a first set of power control parameters targeted towards a second TRP.

Accordingly, the DCI 1002 can configure PUSCH repetitions for multiple SRS resource sets, with each having its own respective parameters (e.g., beam, spatial resolution, TCI state, power control, precoding). The different repetitions may be associated with the same TB in some examples. The DCI can indicate two beams and sets of power control parameters using two corresponding SRI fields for both codebook-based and non-codebook-based PUSCH. For codebook-based PUSCH, two TPMI fields may be included to indicate two precoders for the two sets of repetitions.

In some examples, a UE (e.g., 502) may be configured using DCI to dynamically switch uplink PTRS between a plurality of transmission parameters for PUSCH. Using SRS resources, the UE may dynamically switch between a PUSCH based on a single TRP (sTRP), and a PUSCH based on a multi-TRP (e.g., SDM), where the PUSCH is associated with a plurality of transmission parameters. FIG. 10 illustrates a block diagram 1000 for scheduling PUSCH for single-TRP and multi-TRP configurations according to some aspects of the present disclosure.

As discussed above, allocations of the PTRS may be based on an RRC configuration, where a maxNrofPorts parameter may be configured for 1 port or 2 ports for full-coherent, partial-coherent or non-coherent UEs. An actual number of PTRS ports for non-codebook-based configurations, where maxNrofPorts=2, may be based on a value indicated in the SRI field. The SRI field may indicate one or more SRS resources. Each SRS resource may be configured with a PTRS port index. If the SRS resources indicated via the SRI field correspond to a same value for the PTRS port index, then one PTRS port may be configured. Otherwise, 2 PTRS ports may be configured.

Figure 11:
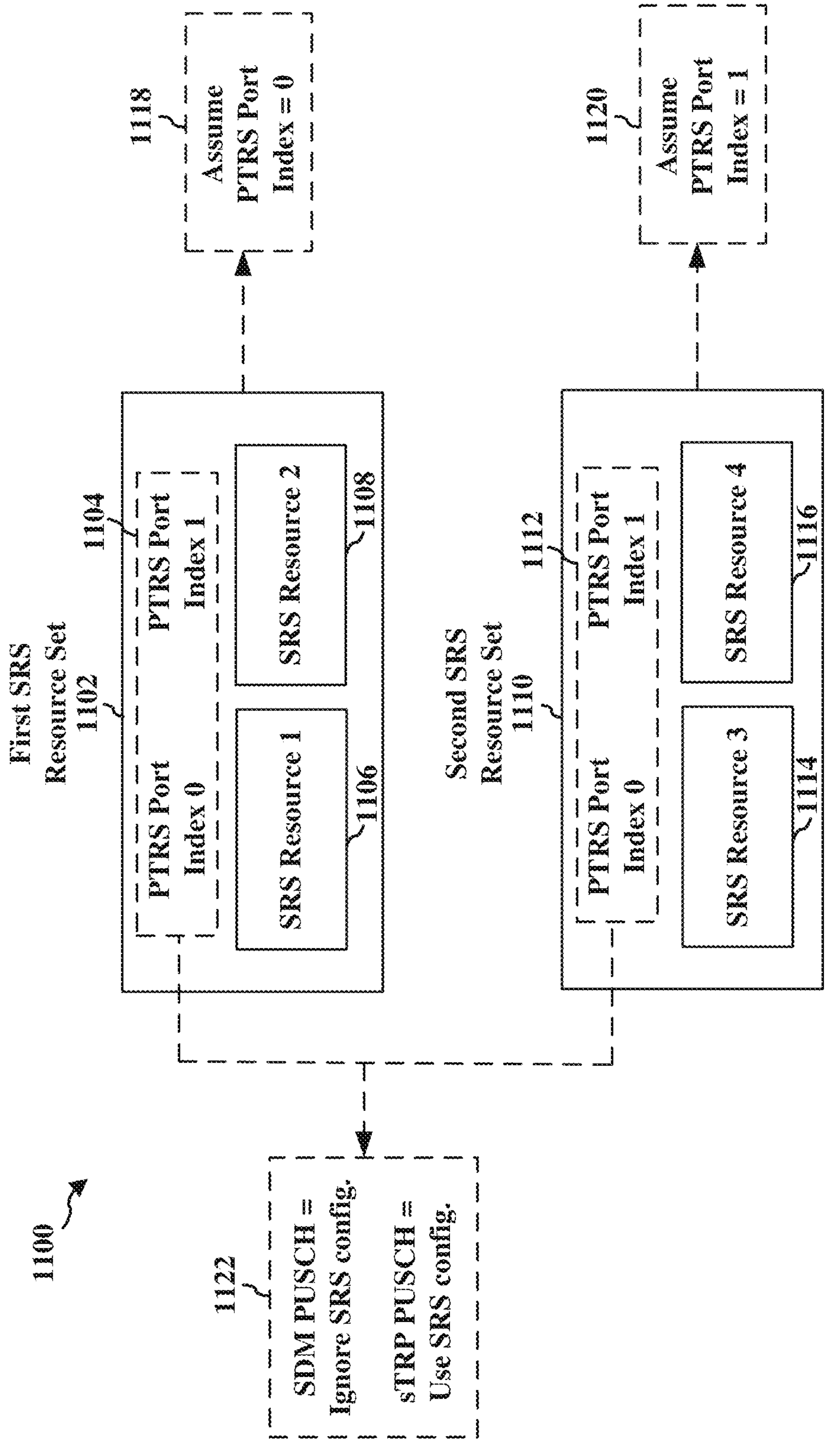
FIG. 11 illustrates a block diagram for scheduling PUSCH for single-TRP and SDM configurations according to some aspects of the present disclosure.

In the example of FIG. 11, the UE (e.g., 502), may be configured with a first SRS resource set 1102 and a second SRS resource set 1110, where the first SRS resource set 1102 is configured with a PTRS port index setting 1104 ("PTRS Port Index 0", "PTRS Port Index 1") associated with two SRS resources 1106, 1108. Similarly, the second SRS resource set 1110 is configured with a PTRS port index setting 1112 ("PTRS Port Index 0", "PTRS Port Index 1") associated with two SRS resources 1114, 1116. Here, the UE is configured with multiple PTRS ports (maxNrofPorts=2) and is also configured with 2 SRS resource sets with usage set to "nonCodebook" for SDM. In this case, the UE will assume that the port indexes for all the SRS resources in the first SRS resource set 1102 are set to "zero" 1118 (PTRS Port Index=0), and that the SRS resources in the second SRS resource set 1110 are set to "one", with the SRS resources within a respective SRS resource set being configured with the same PTRS port. When the UE is scheduled with sTRP PUSCH via one of the resource sets (e.g., SRS resource set 1110), the UE functions using the resource set as though the actual number of PTRS ports is 1, since the SRS resources within a given SRS resource set are configured with the same PTRS port.

In another example illustrated in FIG. 11, if the UE (e.g., 502) is scheduled for SDM PUSCH (as opposed to sTRP PUSCH), the UE ignores all the PTRS port index settings (1104, 1112) of one of the SRS resources (1106-1108, 1114-1116) of either the first SRS resource set 1102 or the second SRS resource set 1110. Under this configuration, the UE may be configured for either SDM PUSCH or sTRP PUSCH (e.g., associated with only one of the SRS resource sets). Thus, within a given SRS resource set 1102, 1110), some SRS resources may be configured with PTRS Port Index 0 and other SRS resource are configured with PTRS Port Index 1. And depending on the indicated SRI in the DCI that schedules sTRP PUSCH, the actual number of PTRS ports can be 1 or 2. At the same time, for scheduling SDM PUSCH, a UE may assume that all SRS resources in the first SRS resource set are associated with first PTRS port, and all SRS resources in the second SRS resource set are associated with the second PTRS port, irrespective of the actual configuration of PTRS port index. In other words, port index configurations of SRS resources are ignored by the UE for SDM PUSCH when both SRS resource sets are indicated, and are used by the UE for sTRP PUSCH when only one of the SRS resource sets is indicated.

During operation, if one PTRS port is configured, the UE may associate the uplink PTRS with one DMRS port of the DMRS ports based on a value included in a PTRS-DMRS association field of the DCI. For example, referring to FIGS. 5 and 7, the UE 502 may perform, at 512, PTRS-DMRS association based on determining, at 510, that 1 PTRS port is configured. The PTRS-DMRS association table 700 may be used to associate the value included in the PTRS-DMRS association field of the DCI with a DMRS port. If 2 PTRS ports are configured, the UE may associate the uplink PTRS with the DMRSs port based on a plurality of bits included in a PTRS-DMRS association field of the DCI. For example, referring to FIGS. 5 and 7, the UE 502 may perform, at 512, PTRS-DMRS association based on determining, at 510, that 2 PTRS ports are configured. The PTRS-DMRS association table 650 may be used to associate the value of 2 bits included in the PTRS-DMRS association field of the DCI with the DMRS ports.

In some examples, a first PTRS port may be shared by one or more first DMRS ports and a second PTRS port may be shared by one or more second DMRS ports, where the DMRS port is included in the one or more first DMRS ports or the one or more second DMRS ports. As illustrated in the PTRS-DMRS association table 750, a first bit of the plurality of bits may be indicative of a first DMRS port of the one or more first DMRS ports and a second bit of the plurality of bits may be indicative of a second DMRS port of the one or more second DMRS ports. As further illustrated in the PTRS-DMRS association table 750, the first bit of the plurality of bits may be an MSB and the second bit of the plurality of bits is an LSB. The UE may map the DMRS ports to a beam based on an SRS resource set. For example, referring to FIG. 5, the UE 502 may map, at 514, the DMRS port to a beam based on an SRS resource set.

Figure 12:
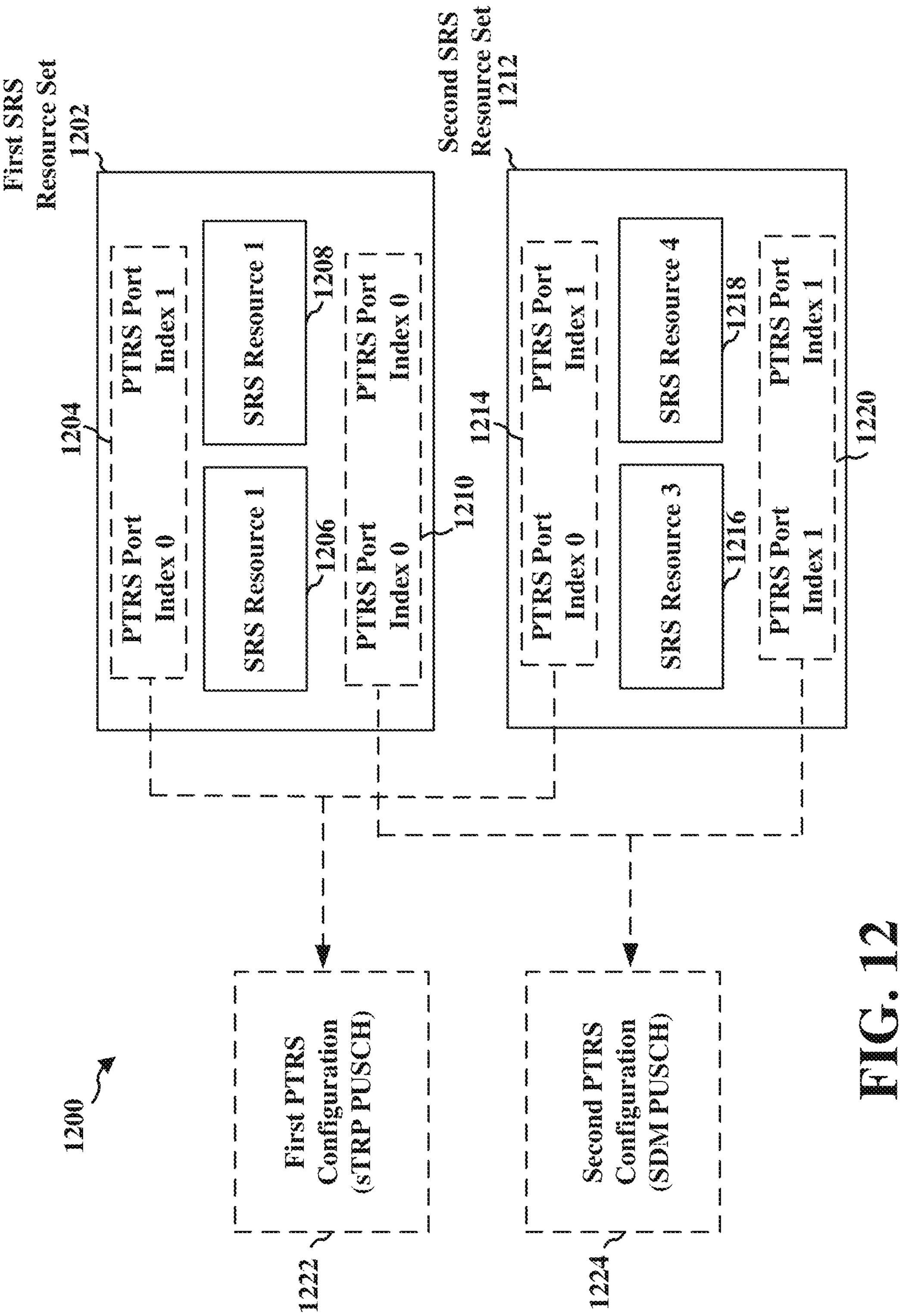
FIG. 12 illustrates a block diagram for scheduling PUSCH for single-TRP and SDM configurations using a plurality of PTRS configurations according to some aspects of the present disclosure.

FIG. 12 illustrates a block diagram 1200 for scheduling PUSCH for single-TRP and multi-TRP configurations using a plurality of PTRS configurations according to some aspects of the present disclosure. In this example, a UE (e.g., 502) may receive a first SRS resource set 1202 and a second SRS resource set 1204, similar to the example in FIG. 11. The first SRS resource set 1202 includes SRS resources 1206, 1208, along with two PTRS port index configurations 1204, 1210, wherein the first PTRS port index configuration 1204 is associated with a sTRP PUSCH and the second PTRS port index configuration 1210 is associated with a SDM PUSCH. The second SRS resource set 1212 similarly includes SRS resources 1216, 1218, along with two PTRS port index configurations 1214, 1220, wherein the first PTRS port index configuration 1214 is associated with a sTRP PUSCH and the second PTRS port index configuration 1220 is associated with a SDM PUSCH.

The configuration of FIG. 12 allows the UE to be configured via RRC (PTRS-UplinkConfig) with two PTRS configurations 1222, 1224. Each PTRS configuration may include a maximum number of ports (maxNrofPorts), frequency and/or time domain density, RE offset, PTRS power, and so forth. When a sTRP PUSCH is scheduled, the sTRP PUSCH 1222 is associated with only one of the resource sets, while a second PTRS configuration 1224 for SMD PUSCH associates a first set of layers with the first SRS resource set (1202) and second set of layers are associated with the second SRS resource set (1212). In some examples, a corresponding PTRS configuration is used (1222, 1224) depending on whether DCI schedules sTRP PUSCH or SDM PUSCH. In addition, for non-codebook based PUSCH, each SRS resource (either in the first set or in the second set) can be configured with two PTRS port index values, where one value is specific to sTRP PUSCH and the other is specific to SDM PUSCH.

The UE may thus configure the maximum number of ports to "one" (maxNrofPorts=1) for sTRP PUSCH scheduling and also configure the maximum number of ports to "two" (maxNrofPorts=2) for SDM PUSCH scheduling, or vice versa. Alternately or in addition, the UE may assume the SRS resources within a respective SRS resource set being configured with the same PTRS port for sTRP PUSCH. In cases were more than 2 PTRS ports are supported for SDM, the configuration of FIG. 12 allows the UE to configure maximum number of ports to one or two (maxNrofPorts=1 or maxNrofPorts=2) for sTRP PUSCH irrespective of configured maximum number of PTRS ports for SDM (e.g., maxNrofPorts=4 for SDM PUSCH).

Figure 13:
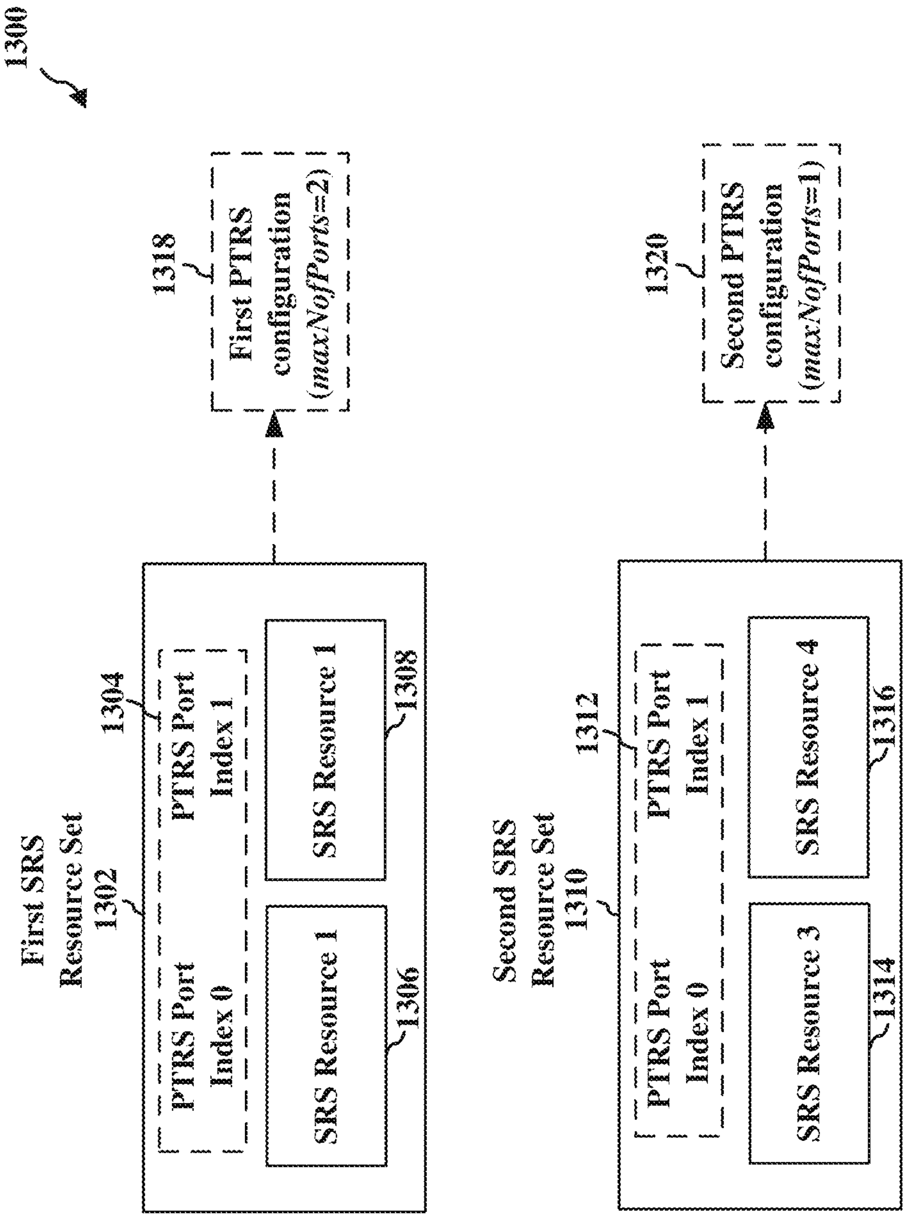
FIG. 13 illustrates a block diagram for scheduling PUSCH for single-TRP and SDM configurations using a plurality of PTRS configurations according to some aspects of the present disclosure.

FIG. 13 illustrates a block diagram 1300 for scheduling PUSCH for single-TRP and multi-TRP configurations using a plurality of PTRS configurations according to some aspects of the present disclosure. In this example, a UE (e.g., 502) may receive a first SRS resource set 1302 and a second SRS resource set 1310, similar to the example in FIG. 11. The first SRS resource set 1302 includes SRS resources 1306, 1308, along with corresponding PTRS port index configuration 1304. The second SRS resource set 1310 similarly includes SRS resources 1314, 1316, along with a corresponding PTRS port index configuration 1312. Here, the UE is configured (PTRS-UplinkConfig) with individual PTRS configurations 1304, 1312 specific to the first SRS resource set 1302 and second SRS resource set 1310. Thus, when sTRP PUSCH is scheduled, PUSCH is associated with only one SRS resource set, and the corresponding PTRS configuration is used depending on which SRS resource set is indicated. As an example, when only the first SRS resource set 1302 is indicated for sTRP, the maximum number of ports may be two as shown in block 1318. In another example, when only the second SRS resource set 1304 is indicated for sTRP, the maximum number of ports may be one as shown in block 1320.

In a further example, when both SRS sets (1302, 1310) are indicated (e.g., for SDM), the maximum number of PTRS ports may be three. During SDM PUSCH a first set of layers are associated with the first SRS resource set 1302 and a second set of layers are associated with the second SRS resource set 1310. When SDM PUSCH is scheduled, both PTRS configurations are used. As in the examples above, each PTRS configuration (1304, 1312) may include a maximum number of ports, frequency/time domain density, RE offset, PTRS power, and so on. In some examples, frequency/time domain density and RE offset may be configured to have the same values to avoid non-uniform mapping of different PTRS ports to REs. In some examples, the configuration of FIG. 13 may allow for a maximum of 4 PTRS ports for SDM PUSCH as well as asymmetry across the two SRS resource sets (e.g., max of 2 PTRS ports associated with the first SRS resource set and max of 1 PTRS port associated with the second SRS resource set).

Figure 14:
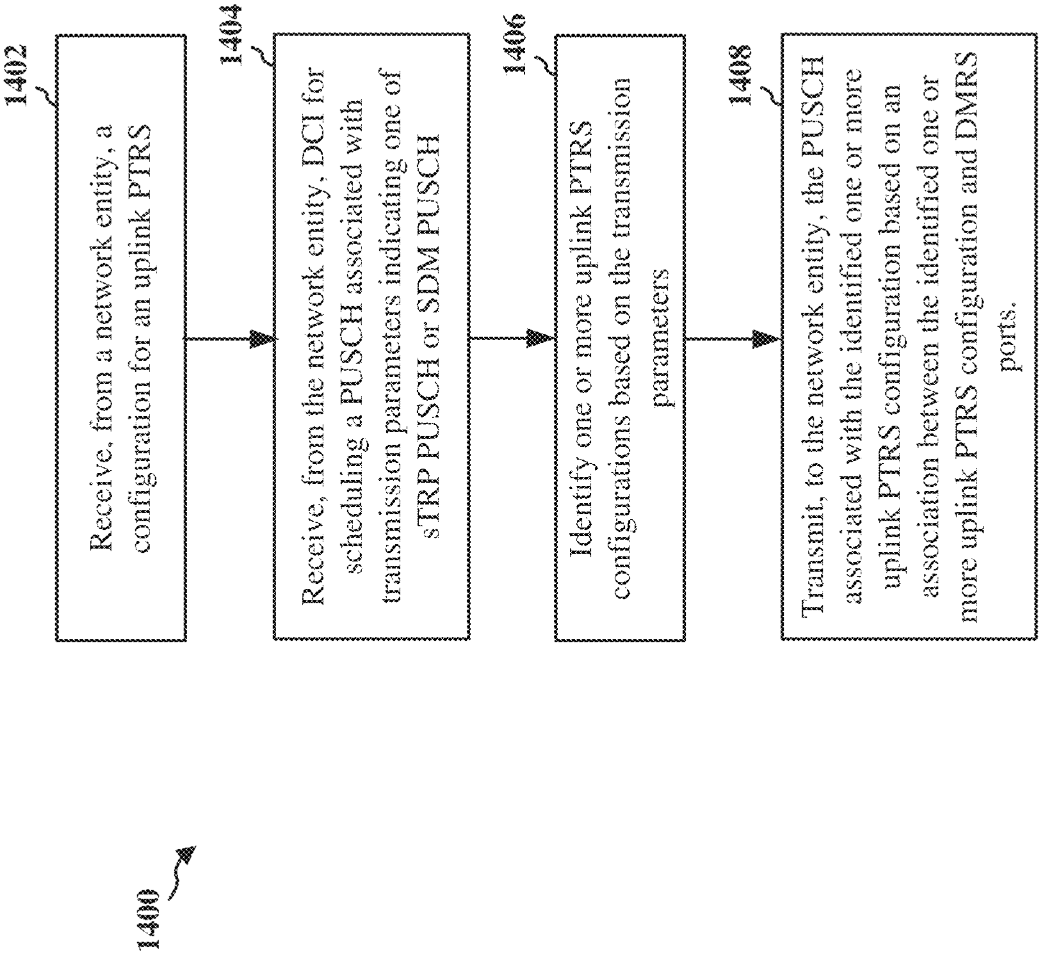
FIG. 14 is a flowchart of a method of wireless communication at a UE according to some aspects.

FIG. 14 is a flowchart 1400 of a method of wireless communication. The method may be performed by a UE (e.g., the UE 104/502), which may include the memory 360 and which may be the entire UE 104/502 or a component of the UE 104/502, such as the TX processor 368, the RX processor 356, and/or the controller/processor 359.

At 1402, the UE may receive, from a network entity, a plurality of configurations for an uplink PTRS. For example, referring to FIG. 5, the UE 502 may receive, at 506, an uplink PTRS configuration from the network entity 504. The reception, at 1402, may be performed by the reception component 1630 of the apparatus 1602 in FIG. 16.

At 1404, the UE may receive, from the network entity, downlink control information (DCI) for scheduling a physical uplink shared channel (PUSCH) associated with transmission parameters indicating one of sTRP PUSCH or SDM PUSCH. For example, referring to FIG. 5, the UE 502 may receive, at 508, a scheduling DCI from the network entity 504 for one of a sTRP or SDM PUSCH. The sTRP/SDM PUSCH may be associated with different parameters for beams, power control, TPMIs, etc. The reception, at 1404, may be performed by the reception component 1630 of the apparatus 1602 in FIG. 16.

At 1406, the UE may identify an uplink PTRS configuration based on the transmission parameters. For example, referring to FIG. 5, the UE 502 may identify, at 512 one or more uplink PTRS configurations based on the transmission parameters for one of a sTRP or SDM PUSCH. The identification, at 1406, may be performed by the ID/association component 1640 of the apparatus 1602 in FIG. 16.

At 1408, the UE may transmit, to the network entity, the PUSCH associated with the identified one or more uplink PTRS configurations based on an association between the identified one or more uplink PTRS configurations and DMRS ports. For example, referring to FIG. 5, the UE 502 may transmit, at 516, the PUSCH associated with the identified configuration to the base station 504 based on the identified uplink PTRS configuration and DMRS ports 512. The transmission, at 1408, may be performed by the transmission component 1634 of the apparatus 1602 in FIG. 16.

Figure 15:
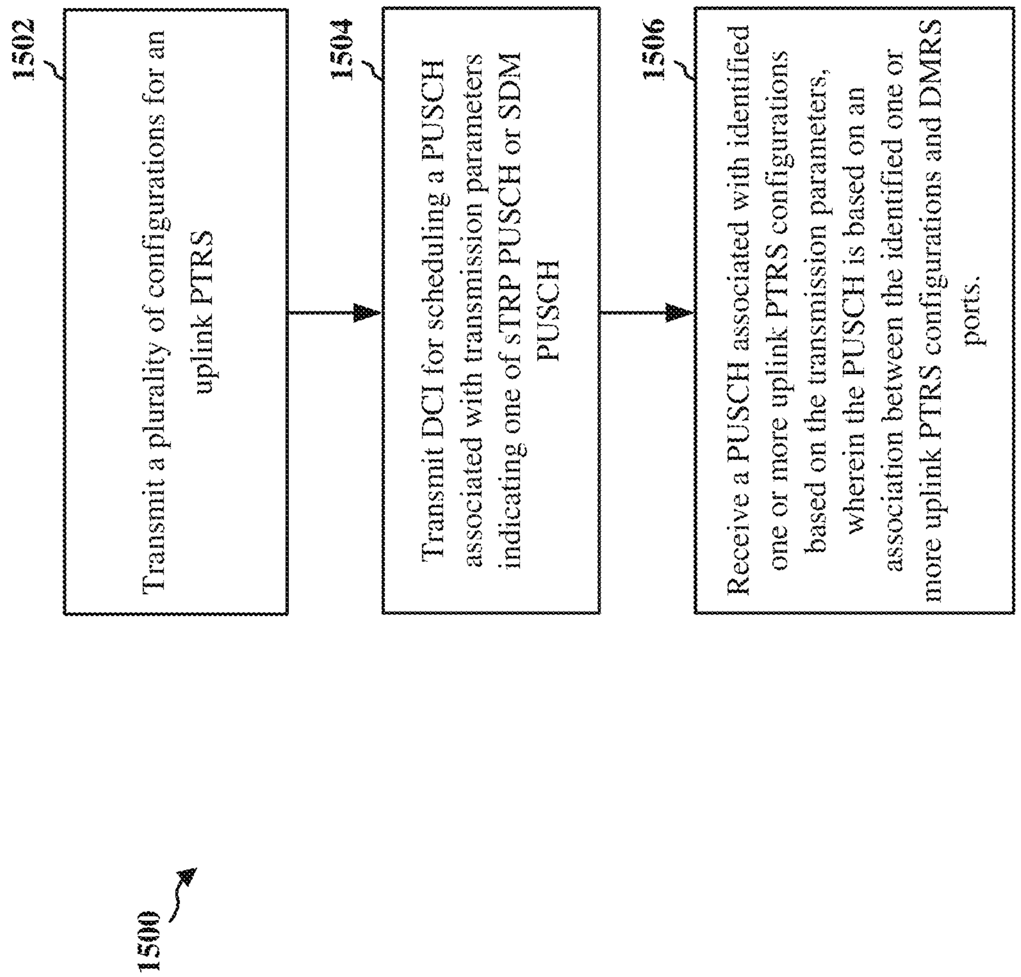
FIG. 15 is a flowchart of a method of wireless communication at a base station according to some aspects.

FIG. 15 is a flowchart 1500 of a method of wireless communication. The method may be performed by a network entity (e.g., the base station 102/504; the apparatus 1702; etc.), which may include the memory 376 and which may be the entire base station 102/504 or a component of the base station 102/504, such as the TX processor 316, the RX processor 370, and/or the controller/processor 375. The network entity may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

In block 1502, the network entity may transmit a plurality of configurations for an uplink PTRS. In block 1504, the network entity may transmit DCI for scheduling a PUSCH associated with transmission parameters indicating one of sTRP PUSCH or SDM PUSCH. In some examples, the transmission component 1734 of network entity 1702, as well as communication manager 1732 may function as a means for transmitting the plurality of configurations for an uplink PTRS and for transmitting DCI for scheduling a PUSCH associated with transmission parameters indicating one of sTRP PUSCH or SDM PUSCH.

In block 1506, the network entity may receive, e.g., from a UE, a PUSCH associated with identified one or more uplink PTRS configurations based on the transmission parameters, wherein the PUSCH is based on an association between the identified one or more uplink PTRS configurations and DMRS ports. In some examples, the reception component 1730 of network entity 1702, as well as communication manager 1732 and PTRS-DMRS association component 1740 may function as a means for receiving a PUSCH associated with identified one or more uplink PTRS configurations based on the transmission parameters, wherein the PUSCH is based on an association between the identified one or more uplink PTRS configurations and DMRS ports.

Figure 16:
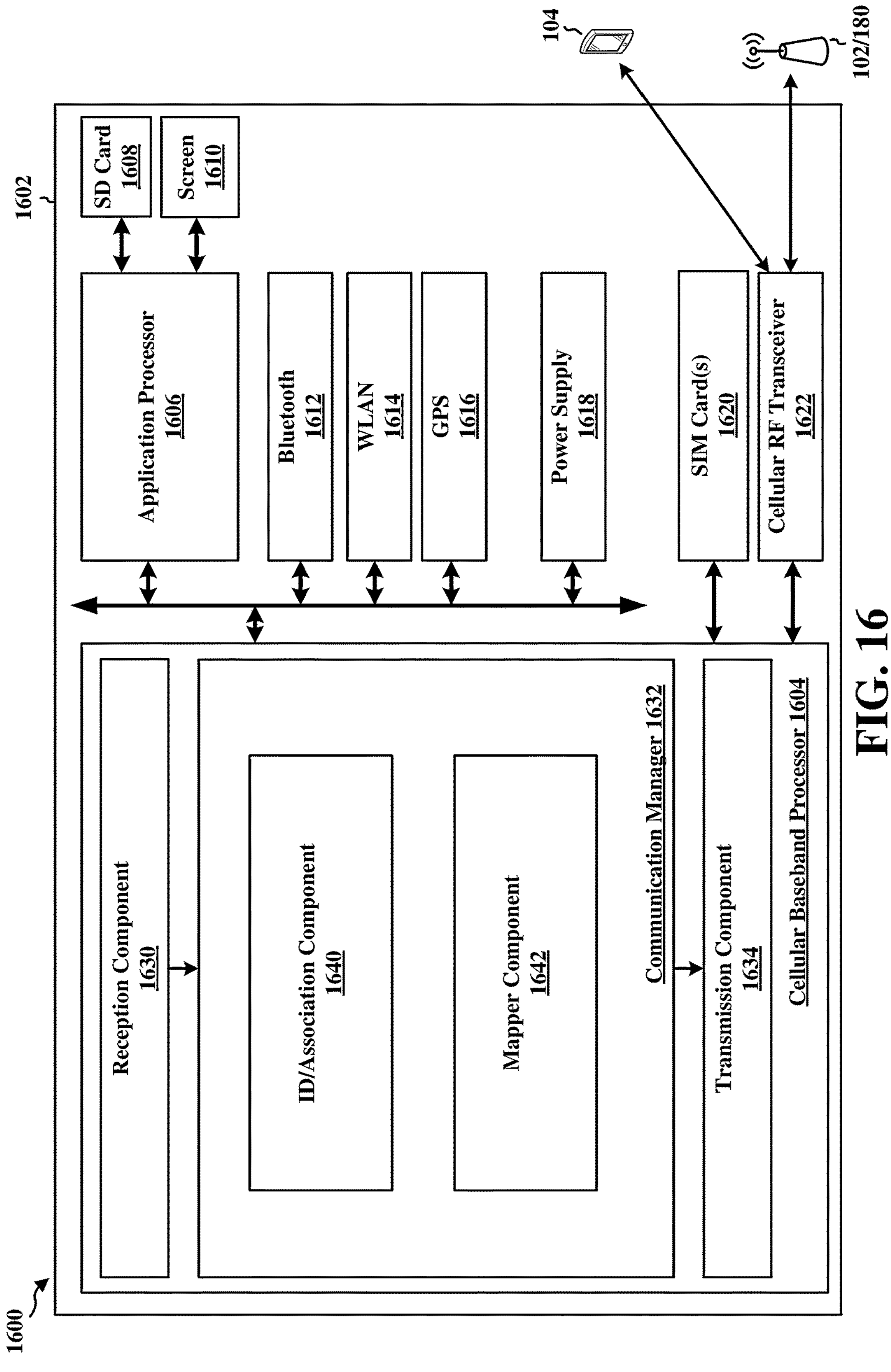
FIG. 16 is a diagram illustrating an example of a hardware implementation for an example apparatus according to some aspects.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The reception component 1630 is configured, e.g., as described in connection with FIG. 14, to receive, from a network entity, a configuration for an uplink PTRS; and to receive, from the base station, DCI that schedules a PUSCH based on one of sTRP or SDM, wherein the PUSCH is associated with a plurality of transmission parameters. The transmission component 1634 is configured, e.g., as described in connection with 1408, to transmit, to the network entity, the PUSCH associated with the plurality of transmission parameters based on the association between the uplink PTRS and DMRS ports.

The communication manager 1532 includes an ID/association component 1640 that may be configured, e.g., as described in connection with 1406, to identify an uplink PTRS configuration based on the transmission parameters and associate the uplink PTRS with one DMRS port of the DMRS ports based on a value included in a PTRS-DMRS association field of the DCI. The communication manager 1632 further includes a mapper component 1642 that is configured to map the DMRS ports to a beam based on an SRS resource set.

The apparatus may include additional components that perform each of the blocks of the algorithm in the flowcharts of FIG. 14. As such, each block in the flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for receiving, from a network entity, a plurality of configurations for an uplink PTRS; means for receiving, from the network entity, DCI for scheduling a PUSCH associated with transmission parameters indicating one of sTRP PUSCH or SDM PUSCH; means for identifying one or more uplink PTRS configurations based on the transmission parameters; and means for transmitting, to the network entity, the PUSCH associated with the identified one or more uplink PTRS configuration based on an association between the identified one or more uplink PTRS configuration and DMRS ports.

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
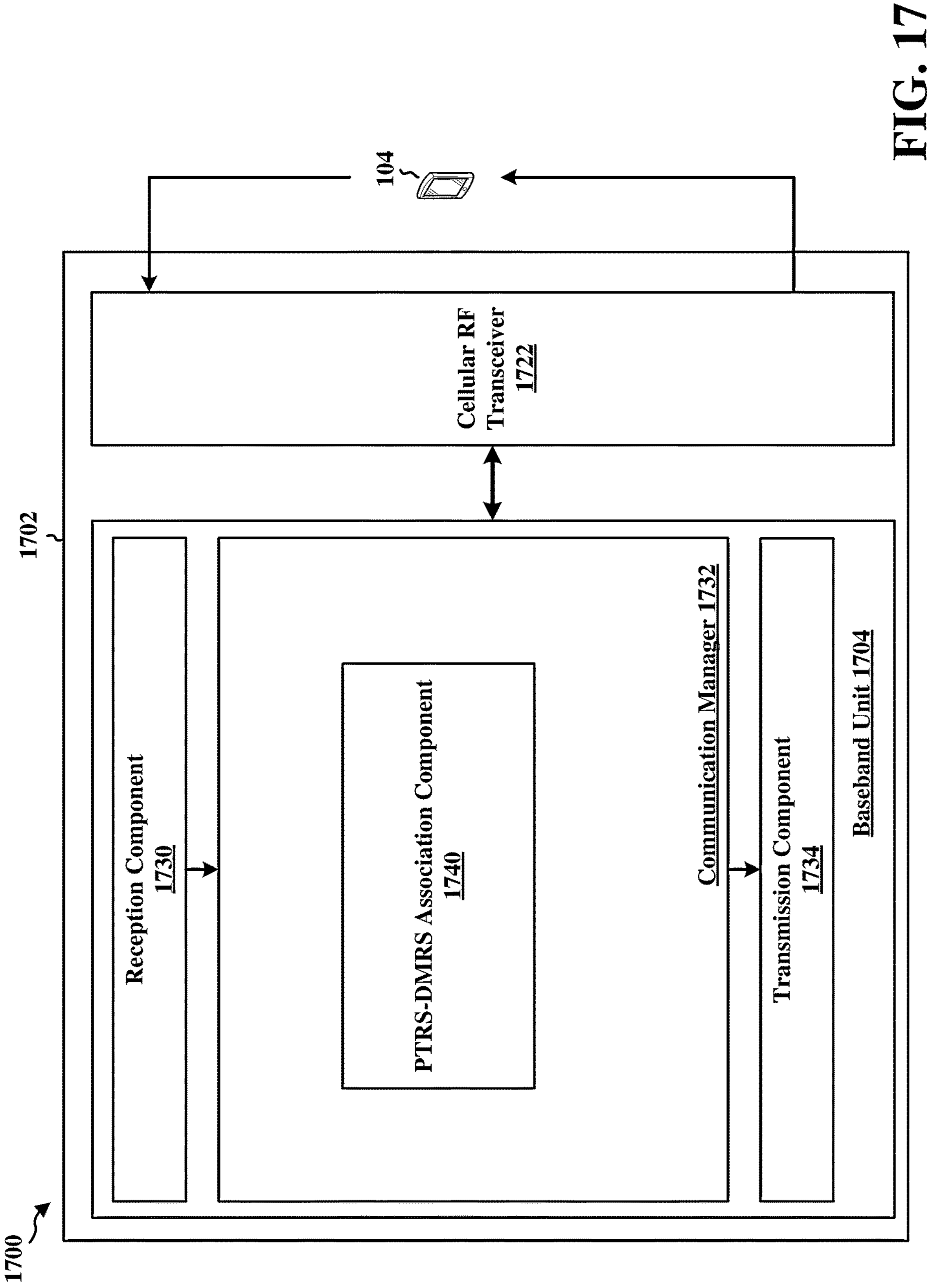
FIG. 17 is a diagram illustrating an example of a hardware implementation for an example apparatus according to some aspects.

FIG. 17 is a diagram 1700 illustrating an example of a hardware implementation for an apparatus 1702. The apparatus 1702 may be a network entity, a component of a network entity, or may implement network entity functionality. For example, the apparatus 1702 may be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some aspects, the apparatus 1702 may include a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes a PTRS-DMRS association component 1740 that is configured, e.g., as described in connection with FIG. 15, to transmit a plurality of configurations for an uplink PTRS; transmit DCI for scheduling a PUSCH associated with transmission parameters indicating one of sTRP PUSCH or SDM PUSCH; and receive a PUSCH associated with identified one or more uplink PTRS configurations based on the transmission parameters, wherein the PUSCH is based on an association between the identified one or more uplink PTRS configurations and DMRS ports.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for transmitting a plurality of configurations for an uplink PTRS; means for transmitting DCI for scheduling a PUSCH associated with transmission parameters indicating one of sTRP PUSCH or SDM PUSCH; and means for receiving a PUSCH associated with identified one or more uplink PTRS configurations based on the transmission parameters, wherein the PUSCH is based on an association between the identified one or more uplink PTRS configurations and DMRS ports.

The means may be one or more of the components of the apparatus 1802 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a user equipment (UE) configured for wireless communication, comprising: a memory; and at least one processor coupled to the memory and configured to: receive, from a network entity, a plurality of configurations for an uplink phase tracking reference signal (PTRS); receive, from the network entity, downlink control information (DCI) for scheduling a physical uplink shared channel (PUSCH) associated with transmission parameters indicating one of single transmit reception point (sTRP) PUSCH or spatial division multiplexing (SDM) PUSCH; identify one or more uplink PTRS configurations based on the transmission parameters; and transmit, to the network entity, the PUSCH associated with the identified one or more uplink PTRS configuration based on an association between the identified one or more uplink PTRS configuration and demodulation reference signal (DMRS) ports.

Aspect 2 may be combined with aspect 1 and includes that the plurality of configurations for the PTRS comprise a first sounding reference signal (SRS) resource set and a second SRS resource set.

Aspect 3 may be combined with any of aspects 1 and/or 2, and includes that the plurality of configurations for the PTRS comprise a PTRS port index configuration associated with the first SRS resource set and the second SRS resource set.

Aspect 4 may be combined with any of aspects 1 through 3, and includes that the at least one processor is further configured to identify the uplink PTRS configuration as having one PTRS port in response to the DCI indicating the sTRP PUSCH.

Aspect 5 may be combined with any of aspects 1 through 4, and includes that the at least one processor is further configured to identify the uplink PTRS configuration as using one of the first SRS resource set or the second SRS resource set in response to the DCI indicating the sTRP PUSCH.

Aspect 6 may be combined with any of aspects 1 through 5, and includes that the at least one processor is further configured to identify the uplink PTRS configuration by associating one PTRS port with the first SRS resource set and another PTRS port with the second SRS resource set in response to the DCI indicating the SDM PUSCH.

Aspect 7 may be combined with any of aspects 1 through 6, and includes that the PTRS port index configuration comprises a first PTRS port index configuration associated with the sTRP PUSCH and a second PTRS port configuration associated with the SDM PUSCH Aspect 8 may be combined with any of aspects 1 through 7, and includes that the at least one processor is further configured to identify the uplink PTRS configuration as having the first PTRS port index configuration in response to the DCI indicating the sTRP PUSCH, and having the second PTRS port index configuration in response to the DCI indicating the SDM PUSCH.

Aspect 9 may be combined with any of aspects 1 through 8, and includes that the PTRS port index configuration comprises a first PTRS port index configuration associated with the first SRS resource set and a second PTRS port configuration associated with the second resource set.

Aspect 10 may be combined with any of aspects 1 through 9, and includes that the at least one processor is further configured to identify the uplink PTRS configuration as having the first or the second PTRS port index configuration in response to the DCI indicating the sTRP PUSCH, and having the first and the second PTRS port index configurations in response to the DCI indicating the SDM PUSCH.

Aspect 11 may be combined with any of aspects 1 through 10, and includes that the at least one processor is further configured to map the DMRS ports to a beam based on at least one of the SRS resource sets.

Aspect 12 may be combined with any of aspects 1 through 11, and includes that the plurality of configurations for PTRS comprises at least one of a maximum number of ports, frequency domain density, time domain density, resource element (RE) offset, and PTRS power.

Aspect 13 may be combined with any of aspects 1 through 12, and includes that the at least one processor is further configured to associate the uplink PTRS with the DMRS ports based on a plurality of bits included in a PTRS-DMRS association field of the DCI.

Aspect 14 may be combined with any of aspects 1 through 13, and includes that one or more first DMRS ports share a first PTRS port and one or more second DMRS ports share a second PTRS port, and wherein the DMRS ports are included in at least one of the one or more first DMRS ports or the one or more second DMRS ports.

Aspect 15 is a method for wireless communication of a user equipment (UE), comprising: receiving, from a network entity, a plurality of configurations for an uplink phase tracking reference signal (PTRS); receiving, from the network entity, downlink control information (DCI) for scheduling a physical uplink shared channel (PUSCH) associated with transmission parameters indicating one of single transmit reception point (sTRP) PUSCH or spatial division multiplexing (SDM) PUSCH; identifying one or more uplink PTRS configurations based on the transmission parameters; and transmitting, to the network entity, the PUSCH associated with the identified one or more uplink PTRS configuration based on an association between the identified one or more uplink PTRS configuration and demodulation reference signal (DMRS) ports.

Aspect 16 may be combined with aspect 15, and includes that the plurality of configurations for the PTRS comprise a first sounding reference signal (SRS) resource set and a second SRS resource set.

Aspect 17 may be combined with any of aspects 15 and/or 16, and includes that the plurality of configurations for the PTRS comprise a PTRS port index configuration associated with the first SRS resource set and the second SRS resource set.

Aspect 18 may be combined with any of aspects 15 through 17 and further includes identifying the uplink PTRS configuration as having one PTRS port in response to the DCI indicating the sTRP PUSCH.

Aspect 19 may be combined with any of aspects 15 through 18 and further includes identifying the uplink PTRS configuration as using one of the first SRS resource set or the second SRS resource set in response to the DCI indicating the sTRP PUSCH.

Aspect 20 may be combined with any of aspects 15 through 19 and further includes identifying the uplink PTRS configuration by associating one PTRS port with the first SRS resource set and another PTRS port with the second SRS resource set in response to the DCI indicating the SDM PUSCH.

Aspect 21 may be combined with any of aspects 15 through 20 and further includes that the PTRS port index configuration comprises a first PTRS port index configuration associated with the sTRP PUSCH and a second PTRS port configuration associated with the SDM PUSCH.

Aspect 22 may be combined with any of aspects 15 through 21 and further includes that identifying the uplink PTRS configuration as having the first PTRS port index configuration in response to the DCI indicating the sTRP PUSCH, and having the second PTRS port index configuration in response to the DCI indicating the SDM PUSCH.

Aspect 23 may be combined with any of aspects 15 through 22 and further includes that the PTRS port index configuration comprises a first PTRS port index configuration associated with the first SRS resource set and a second PTRS port configuration associated with the second resource set.

Aspect 24 may be combined with any of aspects 15 through 23 and further includes that identifying the uplink PTRS configuration as having the first or the second PTRS port index configuration in response to the DCI indicating the sTRP PUSCH, and having the first and the second PTRS port index configurations in response to the DCI indicating the SDM PUSCH.

Aspect 25 may be combined with any of aspects 15 through 24 and further includes mapping the DMRS ports to a beam based on at least one of the SRS resource sets.

Aspect 26 may be combined with any of aspects 15 through 25 and further includes that the plurality of configurations for PTRS comprises at least one of a maximum number of ports, frequency domain density, time domain density, resource element (RE) offset, and PTRS power.

Aspect 27 may be combined with any of aspects 15 through 26 and further includes associating the uplink PTRS with the DMRS ports based on a plurality of bits included in a PTRS-DMRS association field of the DCI.

Aspect 28 may be combined with any of aspects 15 through 27 and further includes that the one or more first DMRS ports share a first PTRS port and one or more second DMRS ports share a second PTRS port, and wherein the DMRS ports are included in at least one of the one or more first DMRS ports or the one or more second DMRS ports.

Aspect 29 is a network entity configured for wireless communication, comprising: a memory; and at least one processor coupled to the memory and configured to: transmit a plurality of configurations for an uplink phase tracking reference signal (PTRS); transmit downlink control information (DCI) for scheduling a physical uplink shared channel (PUSCH) associated with transmission parameters indicating one of single transmit reception point (sTRP) PUSCH or spatial division multiplexing (SDM) PUSCH; and receive a PUSCH associated with identified one or more uplink PTRS configurations based on the transmission parameters, wherein the PUSCH is based on an association between the identified one or more uplink PTRS configurations and demodulation reference signal (DMRS) ports.

Aspect 30 may be combined with aspect 29 and includes that the plurality of configurations for the PTRS comprise a first sounding reference signal (SRS) resource set and a second SRS resource set.

Aspect 31 may be combined with any of aspects 29 and/or 30, and includes that the plurality of configurations for the PTRS comprise a PTRS port index configuration associated with the first SRS resource set and the second SRS resource set.

Aspect 32 may be combined with any of aspects 29 through 31, and includes that the at least one processor is further configured to receive the PUSCH associated with identified one or more uplink PTRS configurations based on an identified uplink PTRS configuration as having one PTRS port in response to the transmitted DCI indicating the sTRP PUSCH.

Aspect 33 may be combined with any of aspects 29 through 32, and includes that the at least one processor is further configured to receive the PUSCH associated with identified one or more uplink PTRS configurations based on an identified uplink PTRS configuration as using one of the first SRS resource set or the second SRS resource set in response to the transmitted DCI indicating the sTRP PUSCH.

Aspect 34 may be combined with any of aspects 29 through 33, and includes that the at least one processor is further configured to receive the PUSCH associated with identified one or more uplink PTRS configurations based on an association of one PTRS port with the first SRS resource set and another PTRS port with the second SRS resource set in response to the transmitted DCI indicating the SDM PUSCH Aspect 35 may be combined with any of aspects 29 through 34, and includes that the PTRS port index configuration comprises a first PTRS port index configuration associated with the sTRP PUSCH and a second PTRS port configuration associated with the SDM PUSCH.

Aspect 36 may be combined with any of aspects 29 through 35, and includes that the at least one processor is further configured to receive the PUSCH associated with identified one or more uplink PTRS configurations based on an identified uplink PTRS configuration as having the first PTRS port index configuration in response to the DCI indicating the sTRP PUSCH, and having the second PTRS port index configuration in response to the transmitted DCI indicating the SDM PUSCH.

Aspect 37 may be combined with any of aspects 29 through 36, and includes that the PTRS port index configuration comprises a first PTRS port index configuration associated with the first SRS resource set and a second PTRS port configuration associated with the second resource set.

Aspect 38 may be combined with any of aspects 29 through 37, and includes that the at least one processor is further configured to receive the PUSCH associated with identified one or more uplink PTRS configurations based on an identified uplink PTRS configuration as having the first or the second PTRS port index configuration in response to the DCI indicating the sTRP PUSCH, and having the first and the second PTRS port index configurations in response to the transmitted DCI indicating the SDM PUSCH.

Aspect 39 may be combined with any of aspects 29 through 38, and includes that the DMRS ports are mapped to a beam based on at least one of the SRS resource sets.

Aspect 40 may be combined with any of aspects 29 through 39, and includes that the plurality of configurations for PTRS comprises at least one of a maximum number of ports, frequency domain density, time domain density, resource element (RE) offset, and PTRS power.

Aspect 41 may be combined with any of aspects 29 through 40, and includes that the uplink PTRS is associated with the DMRS ports based on a plurality of bits included in a PTRS-DMRS association field of the DCI.

Aspect 42 may be combined with any of aspects 29 through 41, and includes that the one or more first DMRS ports share a first PTRS port and one or more second DMRS ports share a second PTRS port, and wherein the DMRS ports are included in at least one of the one or more first DMRS ports or the one or more second DMRS ports.

Aspect 43 is a method for wireless communication for a network entity, comprising: transmitting a plurality of configurations for an uplink phase tracking reference signal (PTRS); transmitting downlink control information (DCI) for scheduling a physical uplink shared channel (PUSCH) associated with transmission parameters indicating one of single transmit reception point (sTRP) PUSCH or spatial division multiplexing (SDM) PUSCH; and receiving a PUSCH associated with identified one or more uplink PTRS configurations based on the transmission parameters, wherein the PUSCH is based on an association between the identified one or more uplink PTRS configurations and demodulation reference signal (DMRS) ports.

Aspect 44 may be combined with aspect 43, and includes that the plurality of configurations for the PTRS comprise a first sounding reference signal (SRS) resource set and a second SRS resource set.

Aspect 45 may be combined with any of aspects 43 and/or 44, and includes that the plurality of configurations for the PTRS comprise a PTRS port index configuration associated with the first SRS resource set and the second SRS resource set.

Aspect 46 may be combined with any of aspects 43 through 45 and further includes that the PUSCH is associated with the identified one or more uplink PTRS configurations based on an identified uplink PTRS configuration as having one PTRS port in response to the transmitted DCI indicating the sTRP PUSCH.

Aspect 47 may be combined with any of aspects 43 through 46 and further includes that the PUSCH is associated with the identified one or more uplink PTRS configurations based on an identified uplink PTRS configuration as using one of the first SRS resource set or the second SRS resource set in response to the transmitted DCI indicating the sTRP PUSCH.

Aspect 48 may be combined with any of aspects 43 through 47 and further includes that the PUSCH is associated with the identified one or more uplink PTRS configurations based on an association of one PTRS port with the first SRS resource set and another PTRS port with the second SRS resource set in response to the transmitted DCI indicating the SDM PUSCH.

Aspect 49 may be combined with any of aspects 43 through 48 and further includes that the PTRS port index configuration comprises a first PTRS port index configuration associated with the sTRP PUSCH and a second PTRS port configuration associated with the SDM PUSCH.

Aspect 50 may be combined with any of aspects 43 through 49 and further includes that the PUSCH is associated with the identified one or more uplink PTRS configurations based on an identified uplink PTRS configuration as having the first PTRS port index configuration in response to the DCI indicating the sTRP PUSCH, and having the second PTRS port index configuration in response to the transmitted DCI indicating the SDM PUSCH.

Aspect 51 may be combined with any of aspects 43 through 50 and further includes that the PTRS port index configuration comprises a first PTRS port index configuration associated with the first SRS resource set and a second PTRS port configuration associated with the second resource set.

Aspect 52 may be combined with any of aspects 43 through 51 and further includes that the PUSCH is associated with the identified one or more uplink PTRS configurations based on an identified uplink PTRS configuration as having the first or the second PTRS port index configuration in response to the DCI indicating the sTRP PUSCH, and having the first and the second PTRS port index configurations in response to the transmitted DCI indicating the SDM PUSCH.

Aspect 53 may be combined with any of aspects 43 through 52 and further includes that the DMRS ports are mapped to a beam based on at least one of the SRS resource sets.

Aspect 54 may be combined with any of aspects 43 through 53 and further includes that the plurality of configurations for PTRS comprises at least one of a maximum number of ports, frequency domain density, time domain density, resource element (RE) offset, and PTRS power.

Aspect 55 may be combined with any of aspects 43 through 54 and further includes that the uplink PTRS is associated with the DMRS ports based on a plurality of bits included in a PTRS-DMRS association field of the DCI.

Aspect 56 may be combined with any of aspects 43 through 55 and further includes that the one or more first DMRS ports share a first PTRS port and one or more second DMRS ports share a second PTRS port, and wherein the DMRS ports are included in at least one of the one or more first DMRS ports or the one or more second DMRS ports.

What is claimed is:

1. A user equipment (UE) configured for wireless communication, comprising:

one or more memories; and one or more processors coupled to the one or more memories and configured to cause the UE to:

receive, from a network entity, a plurality of configurations for an uplink phase tracking reference signal (PTRS);

receive, from the network entity, downlink control information (DCI) for scheduling a physical uplink shared channel (PUSCH) associated with transmission parameters indicating one of single transmit reception point (sTRP) PUSCH or spatial division multiplexing (SDM) PUSCH;

identify, from among the received plurality of configurations for the uplink PTRS, one or more uplink PTRS configurations based on the transmission parameters, wherein the identified one or more uplink PTRS configurations comprise a first subset of the plurality of configurations when the transmission parameters indicate the sTRP PUSCH and comprise a second subset of the plurality of configurations when the transmission parameters indicate the SDM PUSCH, the second subset being different from the first subset; and transmit, to the network entity, the PUSCH associated with the identified one or more uplink PTRS configurations based on an association between the identified one or more uplink PTRS configurations and demodulation reference signal (DMRS) ports.

2. The UE of claim 1, wherein the plurality of configurations for the PTRS comprise a first sounding reference signal (SRS) resource set and a second SRS resource set.

3. The UE of claim 2, wherein the plurality of configurations for the PTRS comprise a PTRS port index configuration associated with the first SRS resource set and the second SRS resource set.

4. The UE of claim 3, wherein the at least one processor is further configured to identify the uplink PTRS configuration as having one PTRS port in response to the DCI indicating the sTRP PUSCH.

5. The UE of claim 3, wherein the at least one processor is further configured to identify the one or more uplink PTRS configurations as using one of the first SRS resource set or the second SRS resource set in response to the DCI indicating the sTRP PUSCH.

6. The UE of claim 3, wherein the at least one processor is further configured to identify the one or more uplink PTRS configurations by associating one PTRS port with the first SRS resource set and another PTRS port with the second SRS resource set in response to the DCI indicating the SDM PUSCH.

7. The UE of claim 3, wherein the PTRS port index configuration comprises a first PTRS port index configuration associated with the sTRP PUSCH and a second PTRS port configuration associated with the SDM PUSCH.

8. The UE of claim 7, wherein the at least one processor is further configured to identify the uplink PTRS configuration as having the first PTRS port index configuration in response to the DCI indicating the sTRP PUSCH, and having the second PTRS port index configuration in response to the DCI indicating the SDM PUSCH.

9. The UE of claim 3, wherein the PTRS port index configuration comprises a first PTRS port index configuration associated with the first SRS resource set and a second PTRS port configuration associated with the second resource set.

10. The UE of claim 9, wherein the at least one processor is further configured to identify the uplink PTRS configuration as having the first or the second PTRS port index configuration in response to the DCI indicating the sTRP PUSCH, and having the first and the second PTRS port index configurations in response to the DCI indicating the SDM PUSCH.

11. The UE of claim 2, wherein the at least one processor is further configured to map the DMRS ports to a beam based on at least one of the SRS resource sets.

12. The UE of claim 1, wherein the plurality of configurations for PTRS comprises at least one of a maximum number of ports, frequency domain density, time domain density, resource element (RE) offset, and PTRS power.

13. The UE of claim 1, wherein the at least one processor is further configured to associate the uplink PTRS with the DMRS ports based on a plurality of bits included in a PTRS-DMRS association field of the DCI.

14. The UE of claim 13, wherein one or more first DMRS ports share a first PTRS port and one or more second DMRS ports share a second PTRS port, and wherein the DMRS ports are included in at least one of the one or more first DMRS ports or the one or more second DMRS ports.

15. A method for wireless communication of a user equipment (UE), comprising:

receiving, from a network entity, a plurality of configurations for an uplink phase tracking reference signal (PTRS);

receiving, from the network entity, downlink control information (DCI) for scheduling a physical uplink shared channel (PUSCH) associated with transmission parameters indicating one of single transmit reception point (sTRP) PUSCH or spatial division multiplexing (SDM) PUSCH;

identifying, from among the received plurality of configurations for the uplink PTRS, one or more uplink PTRS configurations based on the transmission parameters, wherein identifying the one or more uplink PTRS configurations comprises selecting, from among the received plurality of configurations for the uplink PTRS, a first subset of the plurality of configurations when the transmission parameters indicate the sTRP PUSCH and selecting, from among the received plurality of configurations for the uplink PTRS, a second subset of the plurality of configurations when the transmission parameters indicate the SDM PUSCH, the second subset being different from the first subset; and transmitting, to the network entity, the PUSCH associated with the identified one or more uplink PTRS configurations based on an association between the identified one or more uplink PTRS configurations and demodulation reference signal (DMRS) ports.

16. The method of claim 15, wherein the plurality of configurations for the PTRS comprise a first sounding reference signal (SRS) resource set and a second SRS resource set.

17. The method of claim 16, wherein the plurality of configurations for the PTRS comprise a PTRS port index configuration associated with the first SRS resource set and the second SRS resource set.

18. The method of claim 17, further comprising identifying the uplink PTRS configuration as having one PTRS port in response to the DCI indicating the sTRP PUSCH.

19. The method of claim 17, further comprising identifying the one or more uplink PTRS configurations as using one of the first SRS resource set or the second SRS resource set in response to the DCI indicating the sTRP PUSCH.

20. The method of claim 17, further comprising identifying the one or more uplink PTRS configurations by associating one PTRS port with the first SRS resource set and another PTRS port with the second SRS resource set in response to the DCI indicating the SDM PUSCH.

21. The method of claim 17, wherein the PTRS port index configuration comprises a first PTRS port index configuration associated with the sTRP PUSCH and a second PTRS port configuration associated with the SDM PUSCH.

22. The method of claim 21, further comprising identifying the one or more uplink PTRS configurations as having the first PTRS port index configuration in response to the DCI indicating the sTRP PUSCH, and having the second PTRS port index configuration in response to the DCI indicating the SDM PUSCH.

23. The method of claim 17, wherein the PTRS port index configuration comprises a first PTRS port index configuration associated with the first SRS resource set and a second PTRS port configuration associated with the second resource set.

24. The method of claim 23, further comprising identifying the one or more uplink PTRS configurations as having the first or the second PTRS port index configuration in response to the DCI indicating the sTRP PUSCH, and having the first and the second PTRS port index configurations in response to the DCI indicating the SDM PUSCH.

25. The method of claim 16, further comprising mapping the DMRS ports to a beam based on at least one of the SRS resource sets.

26. The method of claim 15, wherein the plurality of configurations for PTRS comprises at least one of a maximum number of ports, frequency domain density, time domain density, resource element (RE) offset, and PTRS power.

27. The method of claim 15, further comprising associating the uplink PTRS with the DMRS ports based on a plurality of bits included in a PTRS-DMRS association field of the DCI.

28. The method of claim 27, wherein one or more first DMRS ports share a first PTRS port and one or more second DMRS ports share a second PTRS port, and wherein the DMRS ports are included in at least one of the one or more first DMRS ports or the one or more second DMRS ports.

29. A network entity configured for wireless communication, comprising:

one or more memories; and one or more processors coupled to the one or more memories and configured to:

transmit a plurality of configurations for an uplink phase tracking reference signal (PTRS);

transmit downlink control information (DCI) for scheduling a physical uplink shared channel (PUSCH) associated with transmission parameters indicating one of single transmit reception point (sTRP) PUSCH or spatial division multiplexing (SDM) PUSCH; and receive a PUSCH associated with one or more uplink PTRS configurations identified, from among the transmitted plurality of configurations for the uplink PTRS, based on the transmission parameters, wherein the one or more uplink PTRS configurations comprise a first subset of the plurality of configurations when the transmission parameters indicate the sTRP PUSCH and comprise a second subset of the plurality of configurations when the transmission parameters indicate the SDM PUSCH, the second subset being different from the first subset, and wherein the PUSCH is based on an association between the identified one or more uplink PTRS configurations and demodulation reference signal (DMRS) ports.

30. A method for wireless communication of a network entity, comprising:

transmitting a plurality of configurations for an uplink phase tracking reference signal (PTRS);

transmitting downlink control information (DCI) for scheduling a physical uplink shared channel (PUSCH) associated with transmission parameters indicating one of single transmit reception point (sTRP) PUSCH or spatial division multiplexing (SDM) PUSCH; and receiving a PUSCH associated with one or more uplink PTRS configurations identified, from among the transmitted plurality of configurations for the uplink PTRS, based on the transmission parameters, wherein the one or more uplink PTRS configurations comprise a first subset of the plurality of configurations when the transmission parameters indicate the sTRP PUSCH and comprise a second subset of the plurality of configurations when the transmission parameters indicate the SDM PUSCH, the second subset being different from the first subset, and wherein the PUSCH is based on an association between the one or more uplink PTRS configurations and demodulation reference signal (DMRS) ports.

* * * * *